United States Patent
Lam et al.

(10) Patent No.: US 8,576,898 B2
(45) Date of Patent: Nov. 5, 2013

(54) SLOC SPOT MONITORING

(75) Inventors: Khanh Lam, San Jose, CA (US); Mark Fimoff, Hoffman Estates, IL (US); Greg Tomezak, Buffalo Grove, IL (US); Dennis Mutzabaugh, Mount Prospect, IL (US)

(73) Assignee: Techwell, Inc., San Jose, CA (US)

( * ) Notice: Subject to any disclaimer, the term of this patent is extended or adjusted under 35 U.S.C. 154(b) by 949 days.

(21) Appl. No.: 12/698,041

(22) Filed: Feb. 1, 2010

(65) Prior Publication Data

US 2010/0322296 A1    Dec. 23, 2010

Related U.S. Application Data

(60) Provisional application No. 61/187,986, filed on Jun. 17, 2009, provisional application No. 61/187,970, filed on Jun. 17, 2009, provisional application No. 61/187,977, filed on Jun. 17, 2009, provisional application No. 61/187,980, filed on Jun. 17, 2009, provisional application No. 61/187,996, filed on Jun. 17, 2009.

(51) Int. Cl.
*H04B 1/38* (2006.01)

(52) U.S. Cl.
USPC ........... 375/222; 375/219; 375/220; 375/224; 375/226; 375/227; 375/229; 375/261; 375/295; 375/298; 375/316; 455/73; 455/91; 455/130; 370/272; 370/273; 370/276; 370/297; 379/27.01; 725/111

(58) Field of Classification Search
USPC ......... 375/219, 220, 222, 224, 226, 227, 229, 375/261, 295, 298, 316; 455/73, 91, 130; 370/272, 273, 276, 297; 379/27.01; 725/111
See application file for complete search history.

(56) References Cited

U.S. PATENT DOCUMENTS

| | | | |
|---|---|---|---|
| 5,559,808 A | 9/1996 | Kostreski et al. | |
| 6,763,193 B1 * | 7/2004 | Chand et al. | 398/76 |
| 6,882,634 B2 | 4/2005 | Bagchi et al. | |
| 7,003,030 B2 | 2/2006 | Abdelilah et al. | |
| 7,089,577 B1 | 8/2006 | Rakib et al. | |
| 7,239,808 B2 * | 7/2007 | Lee et al. | 398/66 |
| 7,248,841 B2 | 7/2007 | Agee et al. | |

OTHER PUBLICATIONS

PCT International Search Report for PCT/US2010/022772 dated Jun. 7, 2010.

* cited by examiner

*Primary Examiner* — Leon Flores
(74) *Attorney, Agent, or Firm* — Anthony Smyth; Loza & Loza, LLP

(57) ABSTRACT

Systems and methods for controlling transmission of signals are described. A camera-side modem is configured to receive two signals from a video camera and to extract a received passband signal from a transmission line. A detector in the camera-side modem generates an enable signal when the received passband signal is identified. The enable signal is used to control transmission of at least one of the baseband video signal and the passband video signal. The passband signal may be identified by an estimate of mean square error in a quadrature amplitude demodulator, a measurement of reliability provided by a constellation detector, a measurement of reliability based on a sequence of frame synchronizations and/or an estimate of mean square error in an equalizer. The detector may monitor a gain factor in an automatic gain control module of the camera-side modem and/or a magnitude of the received passband signal.

19 Claims, 19 Drawing Sheets

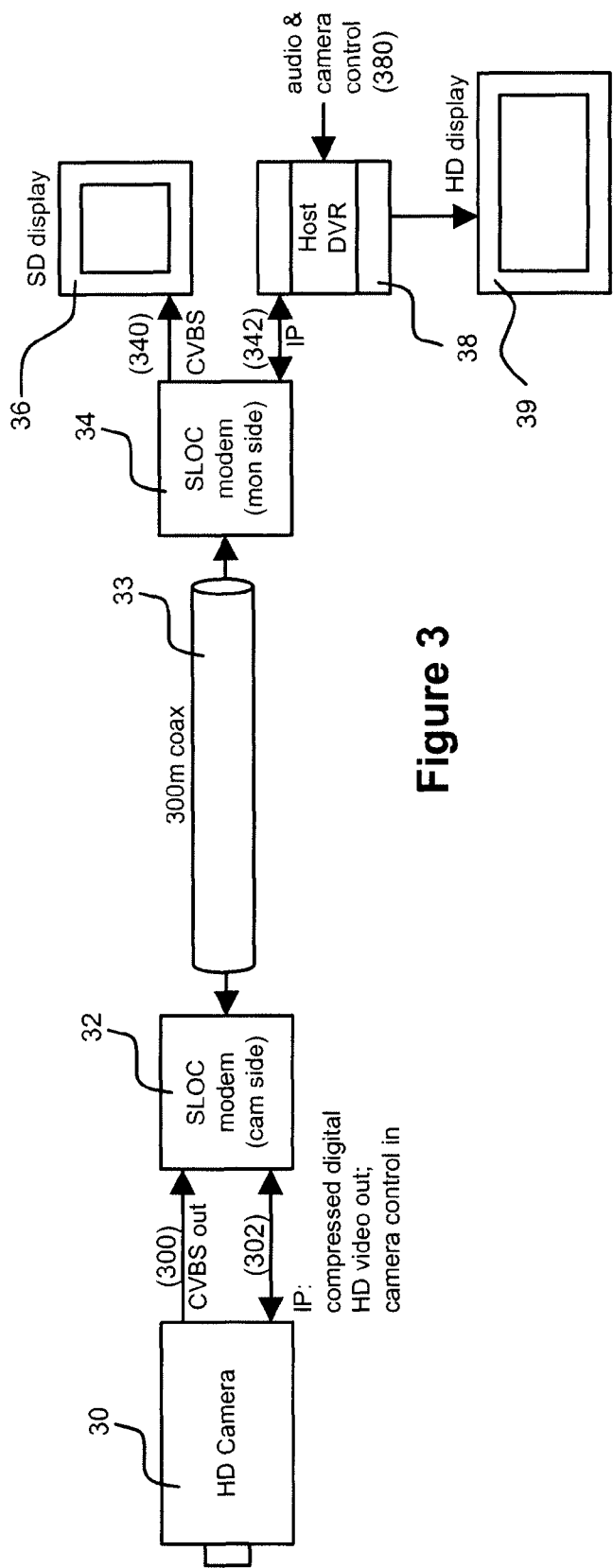
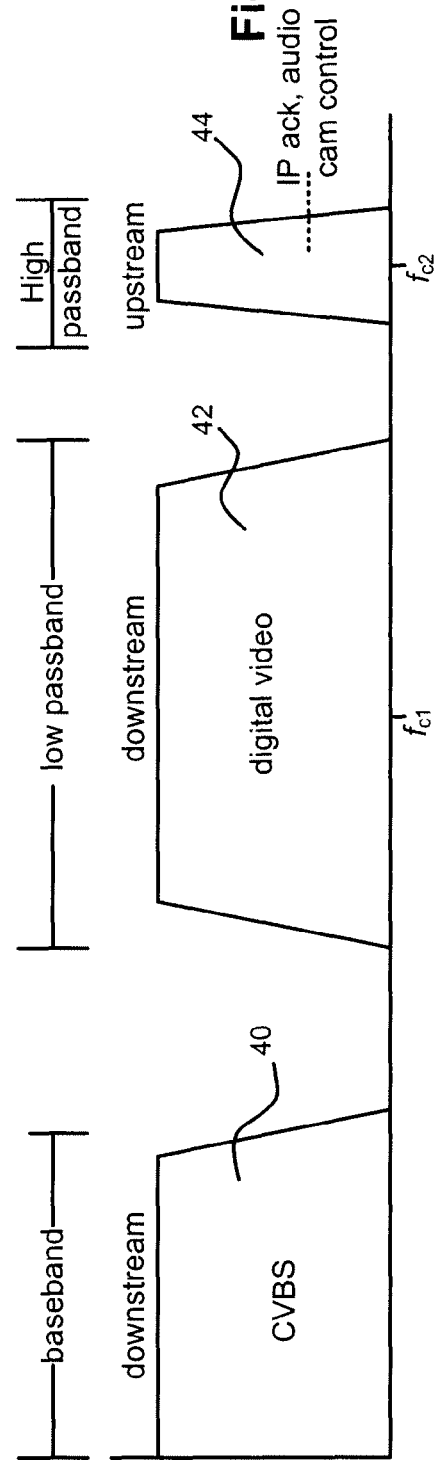

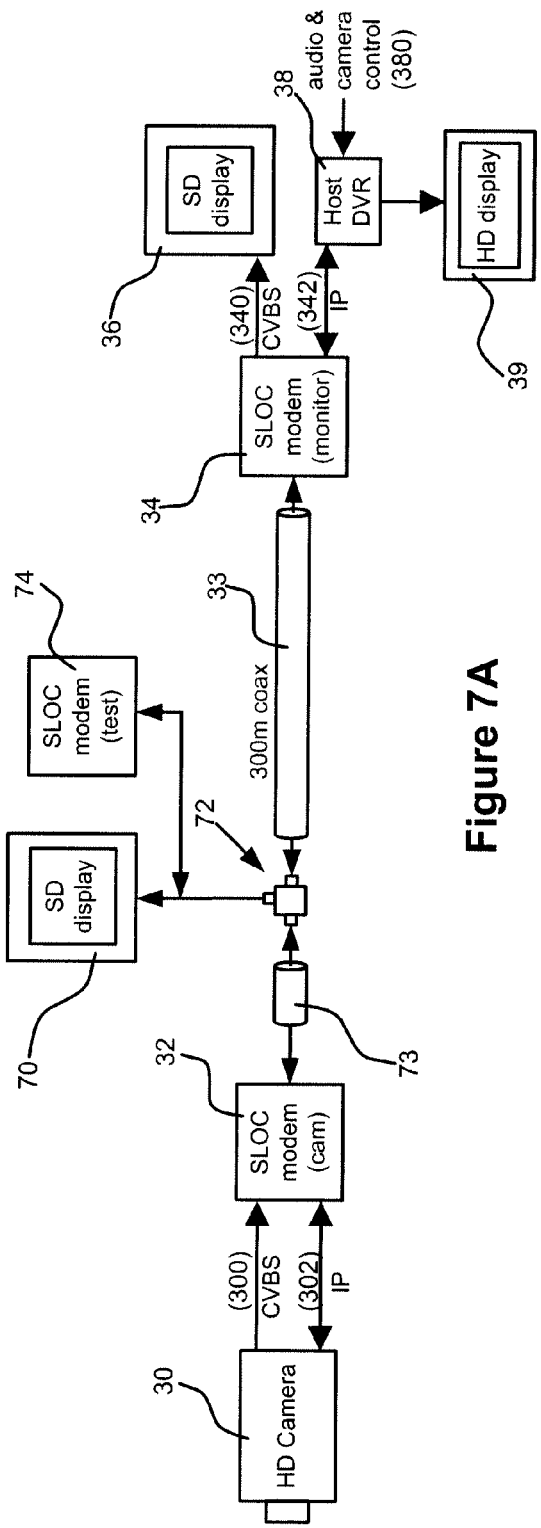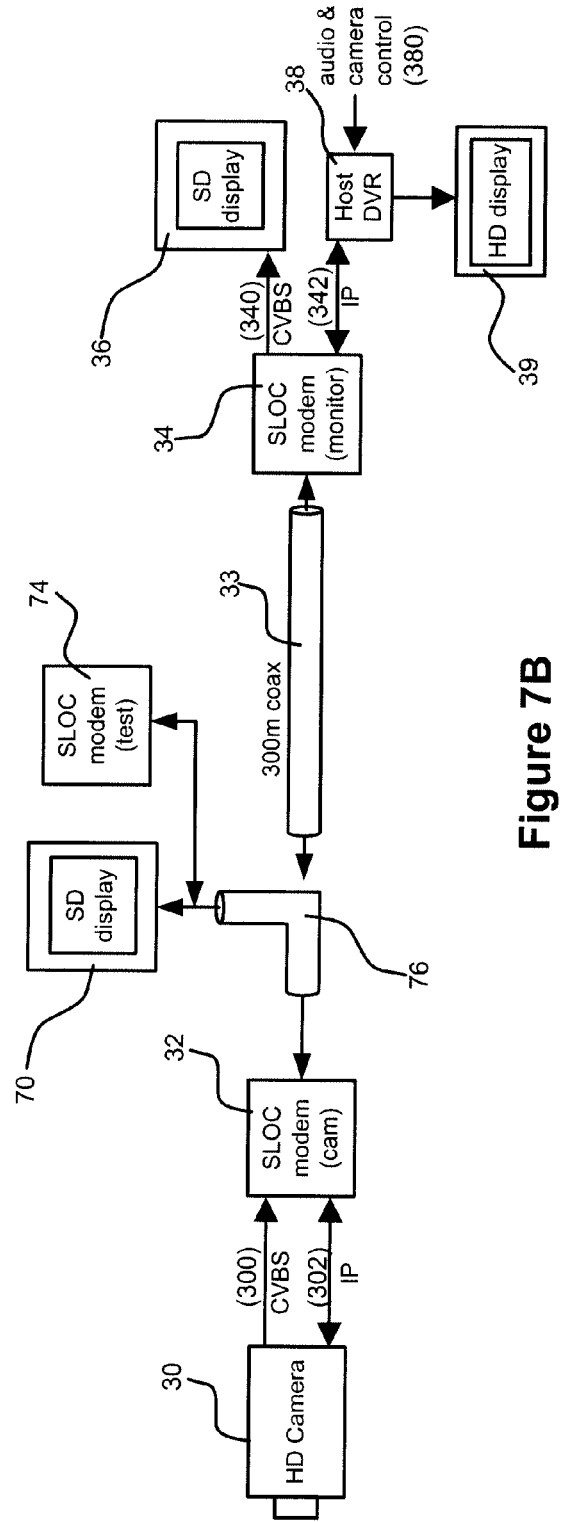

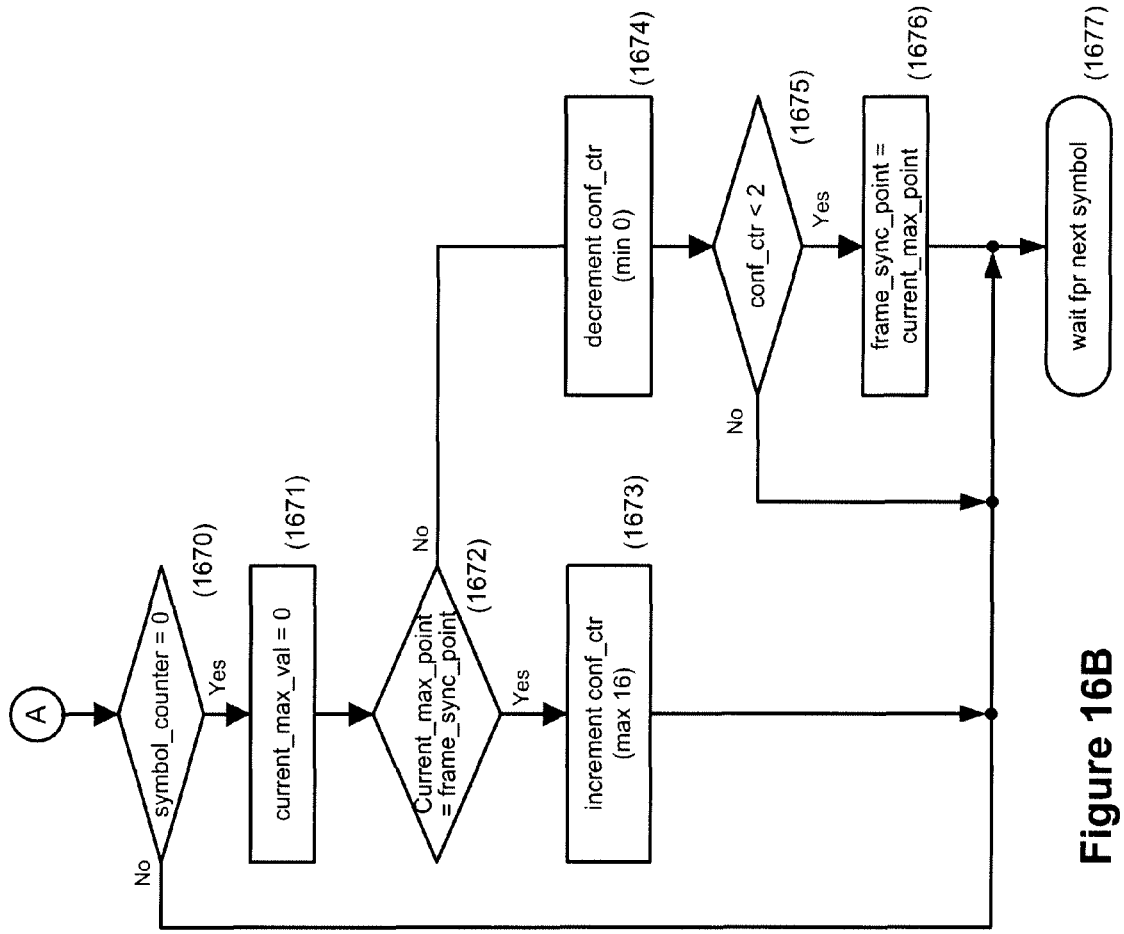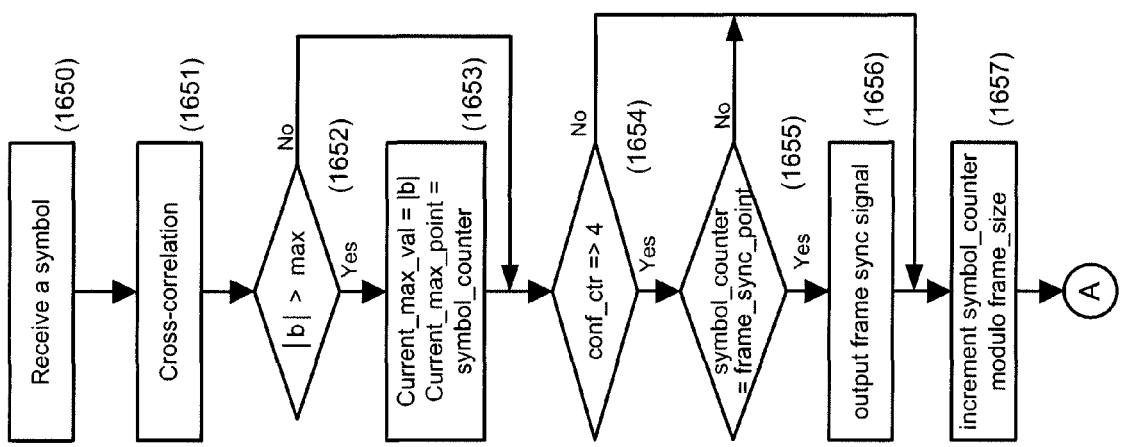
Figure 16B

SLOC SPOT MONITORING

CROSS-REFERENCE TO RELATED APPLICATIONS

The present Application claims priority from U.S. Provisional Patent Application No. 61/187,970 filed Jun. 17, 2009, entitled "SLOC Analog Equalizer For Baseband Video Signal," and from U.S. Provisional Patent Application No. 61/187,977 filed Jun. 17, 2009, entitled "A Method For Constellation Detection In A Multi-Mode QAM Communications System," and from U.S. Provisional Patent Application No. 61/187,980 filed Jun. 17, 2009, entitled "Novel Carrier Phase Offset Correction For A QAM System," and from U.S. Provisional Patent Application No. 61/187,986 filed Jun. 17, 2009, entitled "Novel Frame Structure For A QAM System," and from U.S. Provisional Patent Application No. 61/187,996 filed Jun. 17, 2009, entitled "SLOC SPOT Monitoring," which applications are hereby expressly incorporated by reference herein.

The present Application is related to U.S. patent application Ser. No. 12/363,669, filed Jan. 30, 2009, entitled "Mixed Format Media Transmission Systems and Methods," which is hereby incorporated herein by reference.

BACKGROUND OF THE INVENTION

1. Field of the Invention

The present invention relates generally to multimedia transmission systems and more particularly to systems and methods for transmitting high definition digital video and standard definition analog video over a single cable.

2. Description of Related Art

With the advent of digital broadcast television and streaming video technologies various video cameras, monitors and video recorders have become available with enhanced resolution and advanced features. Closed circuit television (CCTV) systems now offer high definition video outputs and compressed digital video signals for use in applications such as premises surveillance, access control and remote monitoring of facilities. However, legacy systems remain in place and standard definition analog video signals are in widespread use and will continue to be used during the transition to all-digital, high-definition systems. In particular, coaxial cable (coax) has been extensively deployed to carry signals from analog CCTV cameras to monitoring stations. Also, some deployed CCTV cameras transmit compressed digital video signals over local area networks, and these cameras may use the Internet Protocol (IP) as a communications means for transmitting the compressed video signal over category 5 (CAT5) twisted pair cable.

FIG. 1 illustrates a conventional system using coax cable 14 to carry standard definition analog video. A basic analog camera 10 typically generates a composite video baseband signal (CVBS) that can be transmitted up to 300 meters or more using Coax 14. The CVBS signal is commonly provided to a video recording system 18 which often comprises a digital video recorder (DVR) that digitizes the CVBS signal and records it. A conventional monitor or display device 16 may be connected directly to coax 14 to display live standard definition video and to the DVR 18 for playback of recorded video. The standard definition (SD) video typically has a resolution of 720×480 pixels.

FIG. 2 illustrates conventional approaches to transmitting high definition (HD) video (1920×1080 pixels) in conventional systems. An IP based, HD camera 20 generates a compressed digital HD video signal which is transmitted using 100 Mbps Ethernet over standard CAT5 twisted pair cable 24 for distances of up to 100 meters. The signal is received by a host processor and DVR 28. The HD video can be viewed live and also recorded for non-real time playback. The use of IP networking to enable the camera 20 to transmit digital video allows these systems to add some upstream communications from monitor-side to camera-side; this upstream communications consisting of camera control and audio signals. It should be noted that for the live video, noticeable delay may occur due to latency in the IP network and due to the time needed for a processor (e.g. in host DVR 28) to reconstruct the compressed digital video. However, the use of IP networking enables the use of networking tools, including routers, to combining traffic to or from multiple cameras and/or DVR recording and monitoring devices in different network connected locations.

Framing in Digital Communications Systems

Almost all digital data streams have some sort of frame structure such that the data is organized into uniformly sized groups of bits or bytes. Any system that uses block based forward error correction (FEC) will have frames organized around the error correction codeword size. Also, if the system uses interleaving to combat impulse noise, the frame structure will be arranged with the interleaver parameters in mind. If the system uses data randomization to achieve a flat spectrum, the pseudo-random sequence utilized may be synchronized to the frame structure, restarting at the beginning of each frame.

For an RF digital communications system, a receiver must typically first achieve carrier and symbol clock synchronization and equalization. It can then recover the transmitted data. But, to make sense of this incoming data stream, the receiver must also synchronize to the frame structure. In other words, the receiver must know where the error correction code words start and end. It also must be able to synchronize receiver modules such as the deinterleaver to match the interleaver operation of the transmitter so that the resultant deinterleaved bits or bytes are correctly ordered, and the de-randomizer to match the starting point of the pseudo-random sequence used in the transmitter to flatten the spectrum.

Conventional systems often provide for receiver frame synchronization by appending a known pattern of symbols of a fixed length at the beginning or end of the frame. This same pattern repeats every frame, and it often consists of a 2 level (i.e. binary) pseudo-random sequence with favorable auto-correlation properties. This means that while the auto-correlation of the sequence with itself at zero offset yields a large value, if the offset is non-zero the correlation value (sidelobe) is very small. Also the correlation for this frame sync sequence with random symbols will yield a small value. Therefore, if the receiver executes a correlation of the incoming symbols with a stored version of the frame sync pattern, it should expect to yield a large value only at the exact start of each frame. The receiver can then easily determine the starting point of each frame.

There can be several modes of operation for the communication system. The modes can include a variety of combinations of symbol constellations, trellis codes, and interleave patterns. The receiver must have knowledge of the mode in order to successfully recover the transmitted data. This can be achieved by adding additional mode symbols to the frame sync pattern. These mode symbols can be reliably received by using correlation methods since they are sent repeatedly every frame. They can be made even more robust by encoding them using a block code.

BRIEF SUMMARY OF THE INVENTION

Certain embodiments of the invention provide systems and methods for transmitting video signals. A camera-side modem is configured to receive two signals from a video camera, wherein each signal is representative of sequence of images captured by the camera. The camera-side modem may be configured to transmit one of the two signals as a composite baseband video signal and to modulate and transmit the other signal as a passband video signal that does not overlap the baseband signal. The camera-side modem may include a mixer that combines the baseband and passband video signals in order to provide a transmission signal and the camera-side modem may include a diplexer configured to transmit the transmission signal over a transmission line and to extract a received passband signal from the transmission line. The camera-side modem may also include a detector that monitors the camera-side modem and that generates an enable signal when the received passband signal is identified. The enable signal may be used to control transmission of at least one of the baseband video signal and the passband video signal. Typically, the passband video signal is transmitted only when the enable signal is generated.

In certain embodiments, the received passband signal is quadrature amplitude modulated and the detector monitors an estimate of mean square error in a quadrature amplitude demodulator. The enable signal can be generated when the estimate exceeds a threshold value. The detector may monitor a constellation detector and the enable signal can be generated based on a measurement of reliability provided by the constellation detector. The measurement of reliability is based on a sequence of frame synchronizations. The detector may monitor an estimate of mean square error in an equalizer, and the enable signal may be generated when the estimate exceeds a threshold value.

In some embodiments, the detector monitors a gain factor in an automatic gain control module of the camera-side modem and the enable signal is generated when the gain factor has a value less than a threshold value. The detector may monitor a magnitude of the received passband signal and the enable signal can be generated when the magnitude has a value that exceeds a threshold value. The received passband signal typically comprises data encoded according to Internet protocols.

Certain embodiments of the invention provide systems and methods for controlling signaling in a security system. Presence of an upstream quadrature amplitude modulation ("QAM") signal may be detected in a composite signal transmitted on a coax cable. The upstream modem may transmit a composite baseband video signal and a passband video signal on the coax cable when the upstream QAM signal is determined to be present. The composite baseband video signal and the passband video signal can be concurrent representations of a sequence of images captured by a video camera. The upstream modem can transmit the composite baseband video signal on the coax cable and to prevent transmission of the passband video signal, when the upstream QAM signal is determined to be absent.

In some embodiments, the upstream QAM signal is determined to be present when a gain value in an automatic gain control signal exceeds a threshold value and/or when a measurement of magnitude of the upstream QAM signal is less than a threshold value. In some embodiments, the upstream QAM signal is determined to be absent when an estimate of mean square error in an equalizer exceeds a threshold value and/or when an Internet protocol data packet is identified in the upstream QAM signal.

Certain embodiments of the invention comprise an automatically reconfigurable system for transmitting video signals. An upstream modem is configured to receive two signals from a video camera, each signal is representative of sequence of images captured by the camera. The upstream modem is configured to transmit one of the two signals as a composite baseband video signal and to modulate and transmit the other signal as a passband video signal that does not overlap the baseband signal. A downstream modem can be configured to receive the composite baseband video signal and the passband video signal from the upstream modem and further configured to transmit an upstream passband signal to the upstream modem. The upstream modem typically ceases transmission of at least one of the two signals when it detects a degradation in the upstream passband signal.

BRIEF DESCRIPTION OF THE DRAWINGS

FIG. 3 shows a system for simultaneous transmission of standard definition and high definition video according to certain aspects of the invention.

FIG. 4 shows an encoding system used for simultaneous transmission of standard definition and high definition video according to certain aspects of the invention.

FIGS. 7A and 7B depict a system for simultaneous transmission of standard definition and high definition video according to certain aspects of the invention and having a tap or interruption of signal.

FIGS. 16A and 16B illustrate processes for generating a frame sync pulse from a noisy signal according to certain aspects of the invention.

DETAILED DESCRIPTION OF THE INVENTION

Figure 1:
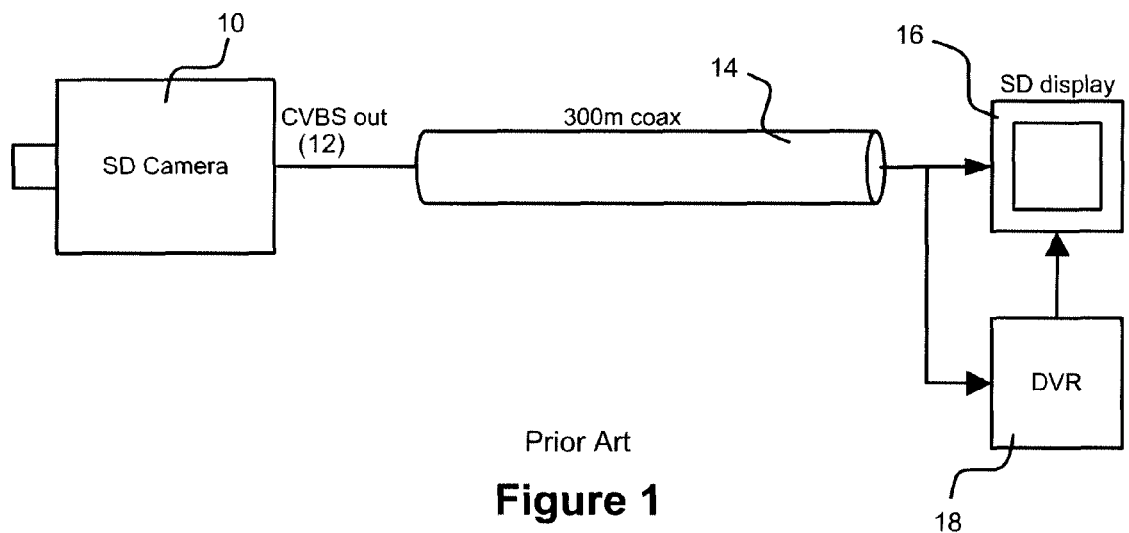
FIG. 1 shows a prior art coax transmission system for standard definition video.
Figure 2:
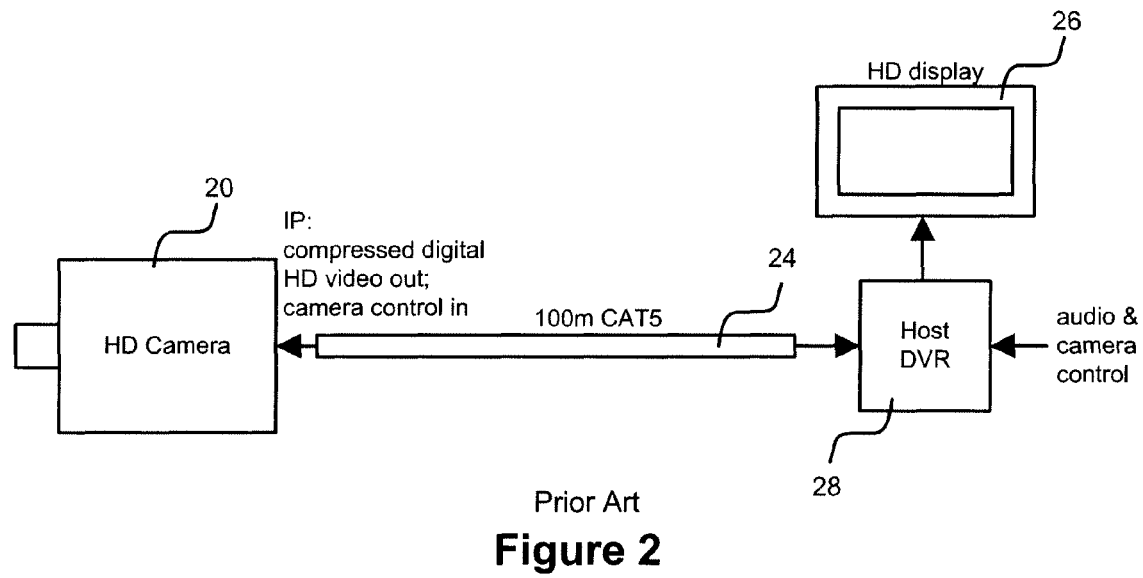
FIG. 2 shows a prior art coax transmission system for high definition video.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention improve the performance of systems and apparatus including those described in the related U.S. patent application Ser. No. 12/363,669 in which baseband video signals may be combined with digital representations of the baseband video signal and with control signals, thereby enabling transmission over a single cable such as a coaxial cable ("coax"). FIG. 3 shows one embodiment that provides a security link over coax ("SLOC") system and FIG. 4 shows one possible modulation scheme for the SLOC system. In the example, HD camera 30 provides an IP output 302 comprising compressed digital HD video, and an auxiliary camera output 300 comprising analog SD CVBS. The compressed HD video IP signal 302 is modulated to passband 42 utilizing a SLOC camera side modem 32 that comprises a QAM modulator (see modulator 52 in modem of FIG. 5). Modulator 52 provides a modulated signal that can be combined with the baseband analog CVBS signal 300. The combined signal is transmitted "downstream" over coax cable 33, typically for distances that can extend to 300 m or longer. At the monitor side, a SLOC monitor side modem 34 separates the baseband CVBS signal 340 from the passband downstream IP signal 342. The CVBS signal 340 feeds an SD display 36 for live, delay-free viewing. The passband downstream IP signal 342 is demodulated with a QAM demodulator (see demodulator 62 in FIG. 6) that outputs a signal to host processor/DVR 38 which may support live (though perhaps slightly delayed) HD viewing on monitor 39 and non-real time HD playback for later viewing.

In the example, upstream communication is provided in accordance with IP protocol requirements. Upstream communication may additionally be used to send audio and camera control signals 380 from the monitor side to the camera 30. Typically the bit rate and corresponding required bandwidth for the upstream signal will be much lower than required for the downstream passband signal. Monitor side SLOC modem 34 includes a QAM modulator (see modulator 64 in FIG. 6) that modulates the IP signal to upstream passband 44. As depicted in FIG. 4, upstream passband 44 and downstream passband 42 are located at different spectral locations. At the camera side, SLOC modem 32 includes a QAM demodulator (see demodulator 54 in modem of FIG. 5) for receiving the upstream signal. This approach offers several advantages over prior systems and methods, including increased operational range, ease of deployment using existing coax infrastructure and obtainment of low-delay, real-time video. In certain embodiments, the upstream signal may include information that identifies characteristics of the communication channel, the signals that are and/or can be transmitted or received and status of equipment coupled to the cable, directly and/or through a modem.

Figure 5:
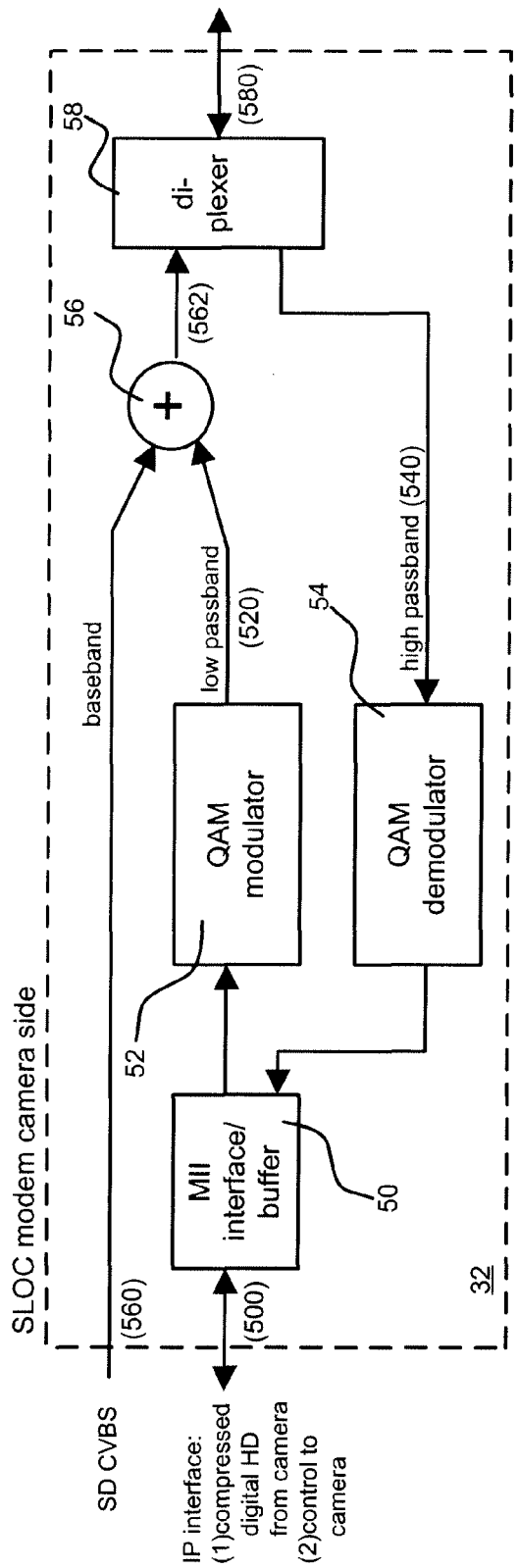
FIG. 5 is a block schematic of a camera side modem according to certain aspects of the invention.

FIG. 5 is a simplified schematic showing additional detail of the SLOC camera-side modem 32 of FIG. 3. The IP connection to the HD camera 500 is interfaced to QAM modulator 52 and QAM demodulator 54 through media independent interface ("MII") module 50. MII 50 may conform to IEEE 802.3 specifications in one example. QAM modulator 52 operates using well known principles to convert the baseband IP data stream 500 into passband 43 QAM symbols 520. These symbols are summed using adder/mixer 56 with baseband CVBS signal 560 and then fed to the diplexer 58. Diplexer 58 can be a 2-way analog device that passes the combined baseband and low passband downstream signal 562 to the coax and receives the high passband upstream signal 540 from the coax and feeds it to QAM demodulator 54. Demodulator 54 typically operates using well known principles to demodulate the high passband upstream signal 540 received from the monitor side and output baseband data to MII 50.

Figure 6:
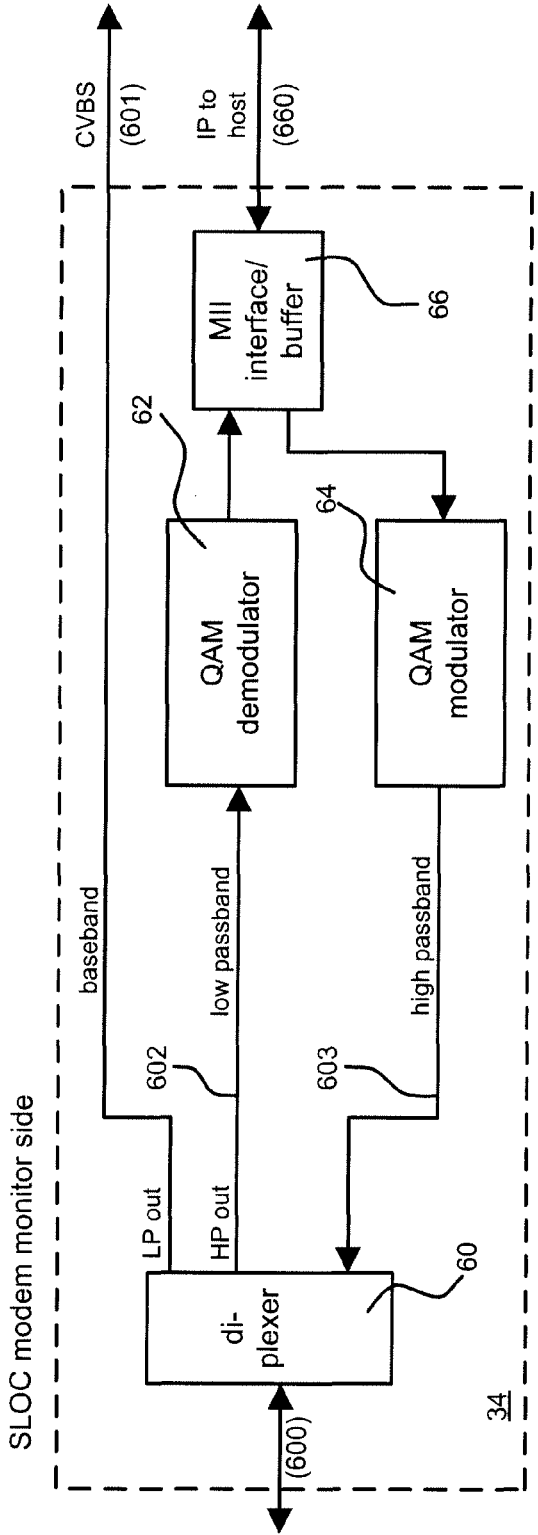
FIG. 6 is a block schematic of a monitor side modem according to certain aspects of the invention.

FIG. 6 is a simplified schematic showing additional detail of the SLOC monitor side modem 34 of FIG. 3. Diplexer 60 receives the downstream combined baseband CVBS and low passband IP signal 600 from a coax cable and splits the signal into component elements 601-603 by low-pass (LP) and high-pass (HP) filtering. CVBS signal 601 may be directly transmitted to a standard definition monitor or other display device. Low passband signal 602 can be fed to QAM demodulator 62 that feeds MII interface module 66. Diplexer can also accept a high passband signal 603 from QAM modulator 64 and may pass this upstream signal to the coax cable. QAM modulator 62 typically takes its input from the MII interface 66 which can be connected to a host/DVR that supports the IP protocol.

FIG. 7A shows a SLOC system based on the system illustrated in FIG. 3 in which a filtered tap 72 is provided between coax cable segments 33 and 73 such that the tap 72 and cable segments 33 and 73 operate to connect camera-side equipment with monitor-side components. Filtered tap 72 is used to extract a portion of baseband CVBS signal 300 to camera-side SD display 70. Display 70 may be provided in proximity to camera 30 for testing, setup and/or local monitoring. Filtered tap 72 typically comprises a low pass filter that blocks unwanted signals such as modulated digital, IP and/or control signals that can interfere with display functions 70. Tap 72 may also include filters or switches that block transmission of signals between modems 32 and 34. For example, a test modem may be 74 may be connected through tap 72 to enable troubleshooting or initial setup of camera-side modem 32 and display side modem 34 may be disconnected to avoid interference and/or degradation of signals. As shown in FIG. 4, the SLOC camera-side modem 32 typically outputs a low passband QAM signal based on a camera-generated portion of signal 302 in addition to the baseband CVBS signal 300 and the SLOC monitor-side modem 34 outputs a high passband QAM signal based on control signal in signal 342. One or more filters may be provided by tap 72 to avoid undesirable interference that can be visible on SD display 70 and/or 36 and to block IP and control signals. It will be appreciated that some displays and monitors lack the filtering necessary to block higher frequency signals (relative to the baseband CVBS signal 300) in the passband signals.

FIG. 7B shows a SLOC system based on the system illustrated in FIG. 3 in which the cable 33 between the camera-side and the monitor-side has been temporarily disconnected at the camera-side, and an SD display device or monitor 70 has been directly connected to the SLOC camera side modem 32 over cable segment 76. A test modem 74 may optionally be connected for test/setup purposes. SD display device 70 displays the baseband CVBS signal and provides an ability to monitor video from the camera 32 near the physical location of camera 30 and the reconfiguration of connections may be desired to facilitate setup and troubleshooting. In FIG. 7B, the low passband QAM signal 302 can cause undesirable visible interference on SD displays 70 that lack high frequency filtering.

In the configurations shown in FIGS. 7A and 7B, partial or complete disconnection of signals between modems 32 and 34 may occur. Partial disconnection of signals may leave QAM signal transmission paths intact. However, some reconfigurations of connections result in disconnection of QAM signaling between camera-side modem 32 and monitor-side SLOC modem 34. Certain embodiments of the invention provide mechanisms by which the camera side modem 32 ceases passband QAM transmission, outputting only the CVBS signal, when the connection between the modems 32 and 34 is broken. It will be appreciated that temporary substitution of test modem 74 for display-side modem typically includes a sequence of that includes disconnection between modems 32 and 34, establishment of connection between modems 32 and 74, disconnection between modems 32 and 74 and reestablishment of connection between modems 32 and 34. Disconnection of QAM signals may be detected using various functional components of modem 32. Accordingly, the operation of the SLOC system is described in detail, below.

QAM Modulator Architecture for a SLOC System

Figure 8:
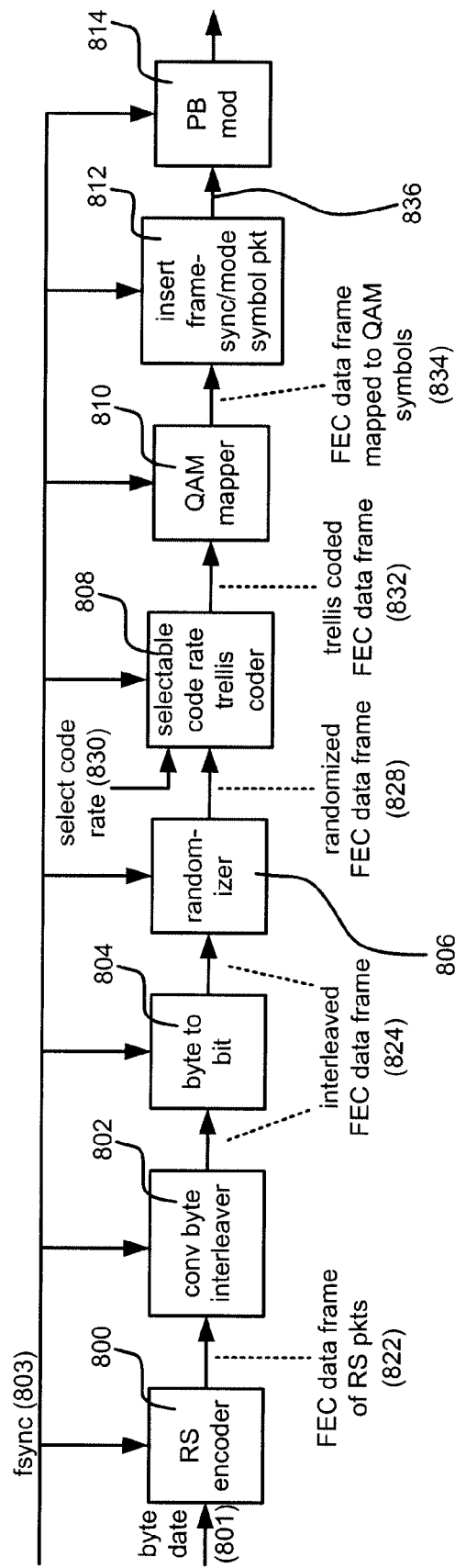
FIG. 8 is a block schematic of a modulator according to certain aspects of the invention.

Certain embodiments of the invention provide novel frame structures for a single carrier communication system used in the described SLOC systems. One frame structure according to certain aspects of the invention utilizes punctured trellis coding and QAM constellation combinations similar to those used in ISDB-T. The number of symbols per frame is a variable integer depending on the mode and the number of RS packets per frame is a constant integer regardless of mode. This arrangement simplifies the design of receiver processing blocks such as the de-randomizer and the de-interleaver because the number of RS packets per frame is always fixed. In conventional systems such as ISDB-T, the number of symbols per frame is constant and the number of RS packets per frame is a variable integer depending on the mode. The frame will be described with reference to an example of the QAM modulator architecture from the modem examples of FIGS. 5-6 and depicted in FIG. 8.

Figure 9:
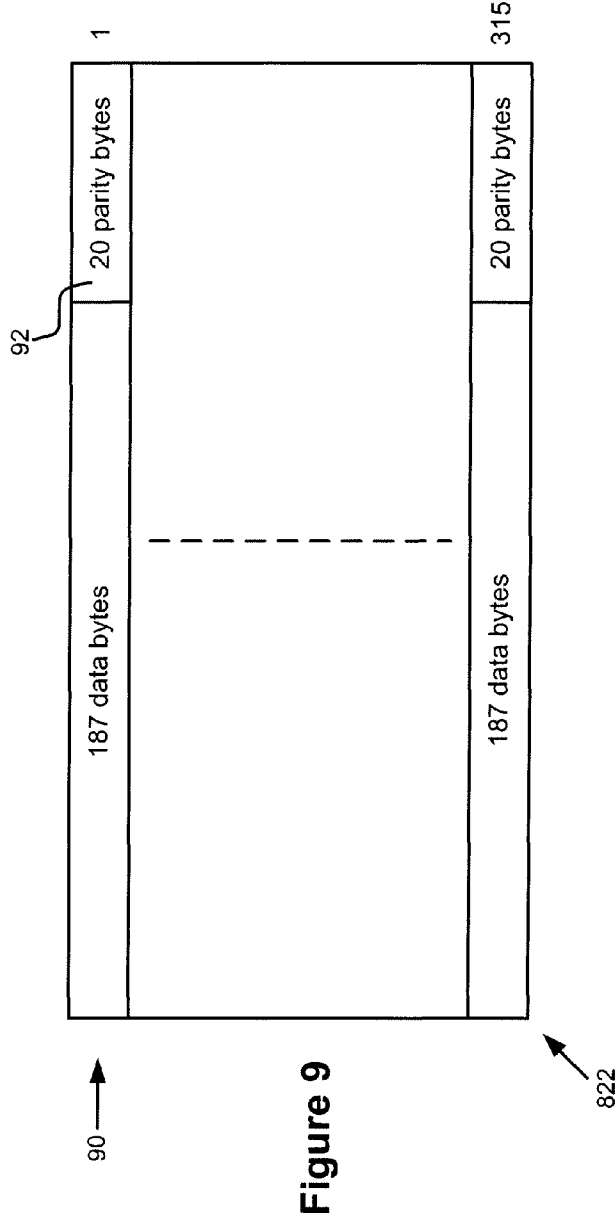
FIG. 9 is a block representation of a frame structure employed in certain embodiments of the invention.

An RS encoder 800 accepts byte data 801 and an externally generated frame sync signal 803 that indicates the start of each group of 315 Reed-Solomon packets 822. As shown in FIG. 9, each packet 90 comprises 207 bytes, of which 20 are parity bytes 92. These 315 Reed-Solomon packets form forward error correction ("FEC") data frame 822 which contains 65205 bytes.

Figure 10:
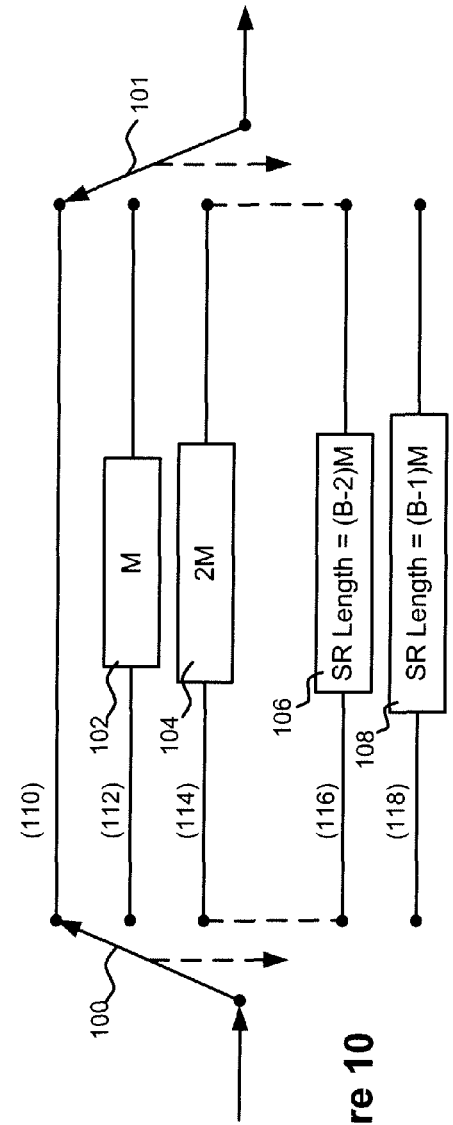
FIG. 10 illustrates operation of a convolutional byte interleaver in certain embodiments of the invention.

A convolutional byte interleaver 802 follows. FIG. 10 illustrates a mode of operation of interleaver 802 that combats impulse noise affecting the transmitted signal. The parameter B in paths 106, 108 is set to 207, and parameter M in paths 102, 104, 106 and 108 is set to 1. Frame sync signal 803 forces input and output commutators 100 and 101 to the top position 110, thus synchronizing the interleaving to the frame structure. Input and output commutators 100 and 101 move down one position 112 as a byte enters the interleaver and a different byte exits the interleaver. When commutators 100 and 101 reach the bottom 118, they shift back to the top 110. Each of the B parallel paths 116, 118 contains a shift register 106 and 108 having the lengths (B−2)M and (B−1)M.

A randomizer 806 produces a randomized FEC data frame 828 by operating on the 65205×8=521640 bits of the FEC data frame 824 by executing an exclusive or operation on those bits with a PN (pseudo-random noise) sequence of length $2^{19}-1$ which is shortened by resetting the PN sequence generator at every frame sync time.

Figure 11:
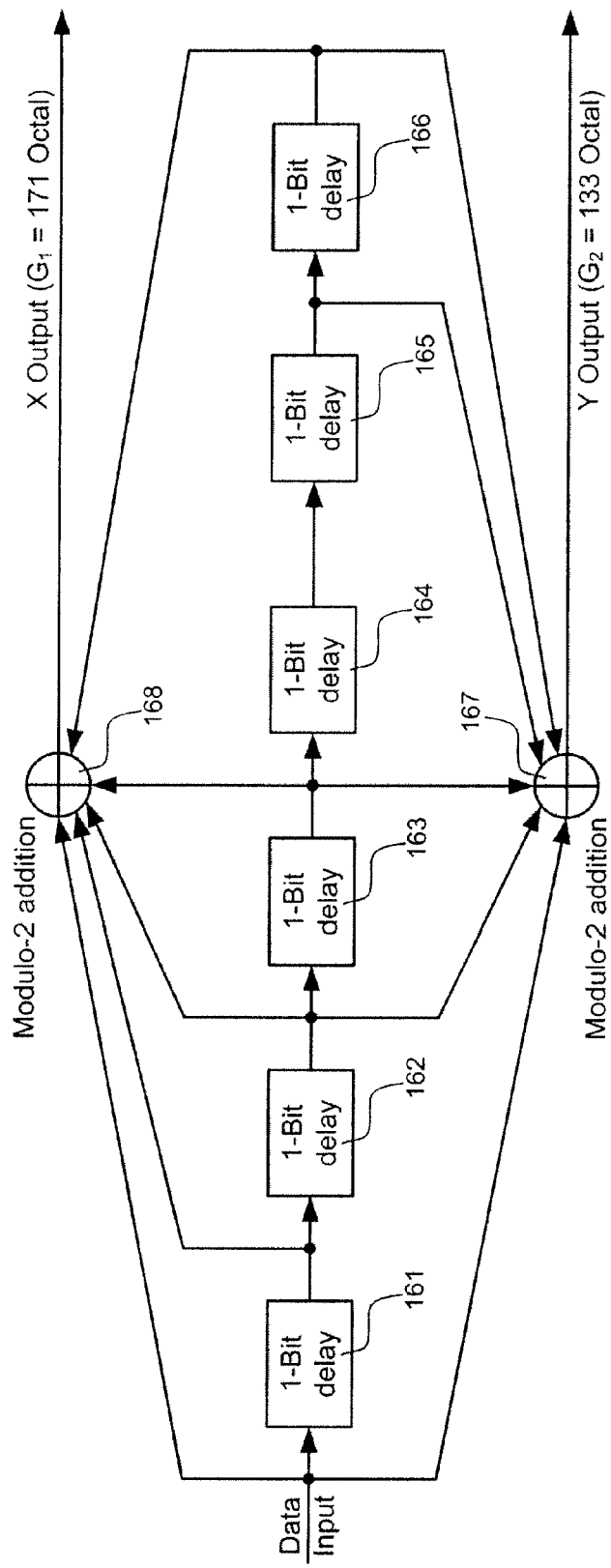
FIG. 11 is a block schematic of a selectable code rate punctured trellis coded modulation employed in certain embodiments of the invention.

Selectable code rate punctured trellis coded modulation ("PTCM") module 808 is shown in more detail in FIG. 11. PTCM 808 uses a method known to those of skill in the art. The method that starts with a 64 state 1/2 rate coder and executes puncturing to achieve any one of 5 different code rates. In certain embodiments, the PTCM 808 can also be completely bypassed (code rate=1). This allows for a selectable trade off between net bit rate and white noise performance for the system. Similar trellis coding techniques are used in ISDB-T and DVB-T systems. PTCM produces two bits 832 at the output for every bit provided to the input 828. However, some of the output bits 832 are discarded according to the selected code rate and corresponding puncture pattern. QAM mapper 810 takes the bits in groups of 2, 4 or 6 from the coder output 832 and maps them into QPSK, 16 QAM, or 64 QAM symbols respectively. Examples of such mappings are provided in FIG. 12.

Figure 13:
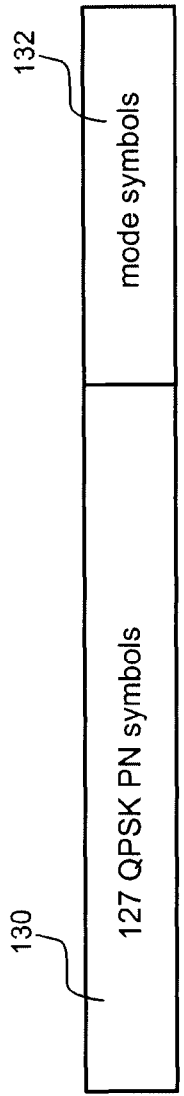
FIG. 13 shows a frame sync/mode packet.

Module 812 adds a frame-sync/mode symbol packet (all symbols are QPSK) to the start of each FEC data frame 834. With reference also to FIG. 13, the first part 130 of this packet comprises 127 symbols and consists of an identical binary PN sequence for both the real and imaginary parts of the symbols. Other PN sequence lengths are possible, and the real and imaginary parts can have the opposite sign. The second part 132 of this packet comprises data that indicate the transmission mode—the selected QAM constellation and the selected trellis code rate. This mode data can be encoded using a block error correction code for added reliability at the receiver. Methods that can be employed include BCH coding and other block codes. In one example, 6 possible trellis code rates including bypass are possible. Additionally, three constellations are possible resulting in 18 modes. Accordingly, 5 bits are needed to represent each of the possible mode selections. The 5 bits could be encoded into a 16 bit code word using an extended BCH code. Since each QPSK symbol contains 2 bits, 8 mode symbols would be required.

Figure 14:
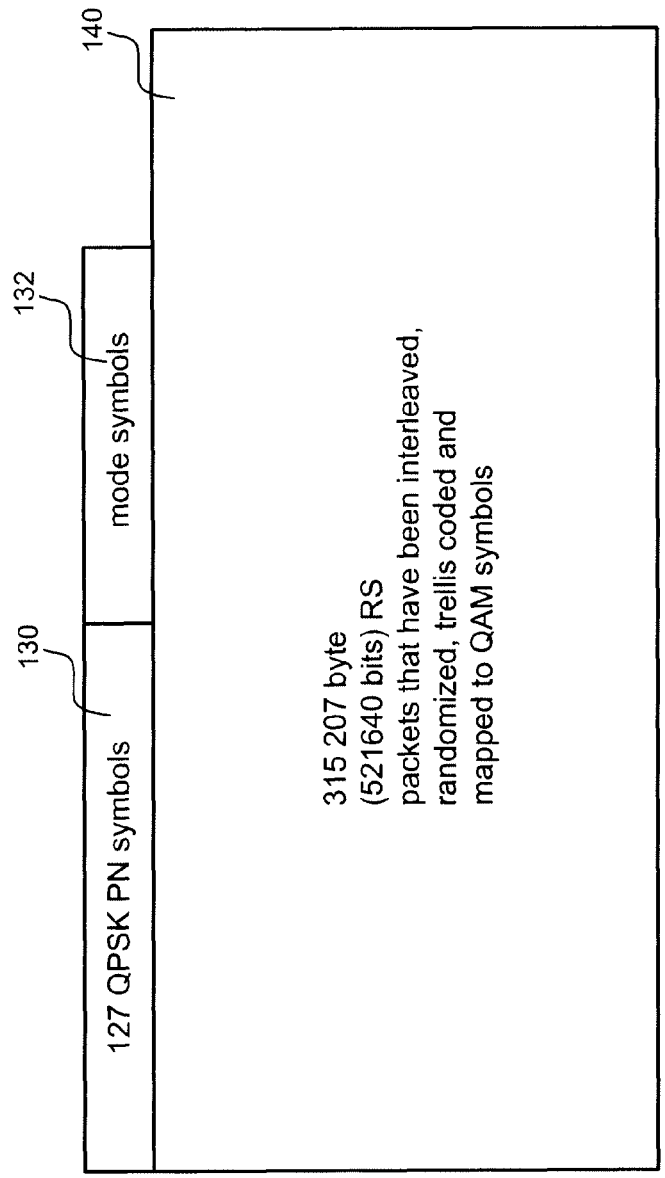
FIG. 14 is a simplified frame structure employed in certain embodiments of the invention.

FIG. 14 illustrates a frame structure 836 provided to passband modulation ("PB Mod") module 814. The trellis coding of FIG. 11 adds bits and the number of data bits per mapped QAM symbol (prior to trellis coding) is shown in Table 1. The number of QAM symbols to which the 315 RS packets (521640 bits) are mapped varies with mode selection. With RS packet size of 207, and 315 packets per frame an integral numbers of symbols per frame is obtained, as shown in Table 2, where each entry is calculated as:

(number of data bits per frame)/(number of data bits per symbol)=521640/(entry from table 1)

TABLE 1

Data Bits per Symbol

| constellation | trellis code rates | | | | | |
|---|---|---|---|---|---|---|
| | ½ | ⅔ | ¾ | ⅚ | ⅞ | 1 |
| QPSK | 1.00 | 4/3 | 1.50 | 5/3 | 1.75 | 2.00 |
| 16 QAM | 2.00 | 8/3 | 3.00 | 10/3 | 3.50 | 4.00 |
| 64 QAM | 3.00 | 4.00 | 4.50 | 5.00 | 5.25 | 6.00 |

TABLE 2

Symbols per Frame

| constellation | trellis code rates | | | | | |
|---|---|---|---|---|---|---|
| | ½ | ⅔ | ¾ | ⅚ | ⅞ | 1 |
| QPSK | 521640 | 391230 | 347760 | 312984 | 298080 | 260820 |
| 16 QAM | 260820 | 195615 | 173880 | 156492 | 149040 | 130410 |
| 64 QAM | 173880 | 130410 | 115920 | 104328 | 99360 | 86940 |

The PB Mod module 814 then modulates the baseband QAM symbols to passband using any suitable method known to those with skill in the art. (See description below related to FIG. 21).

Figure 15:
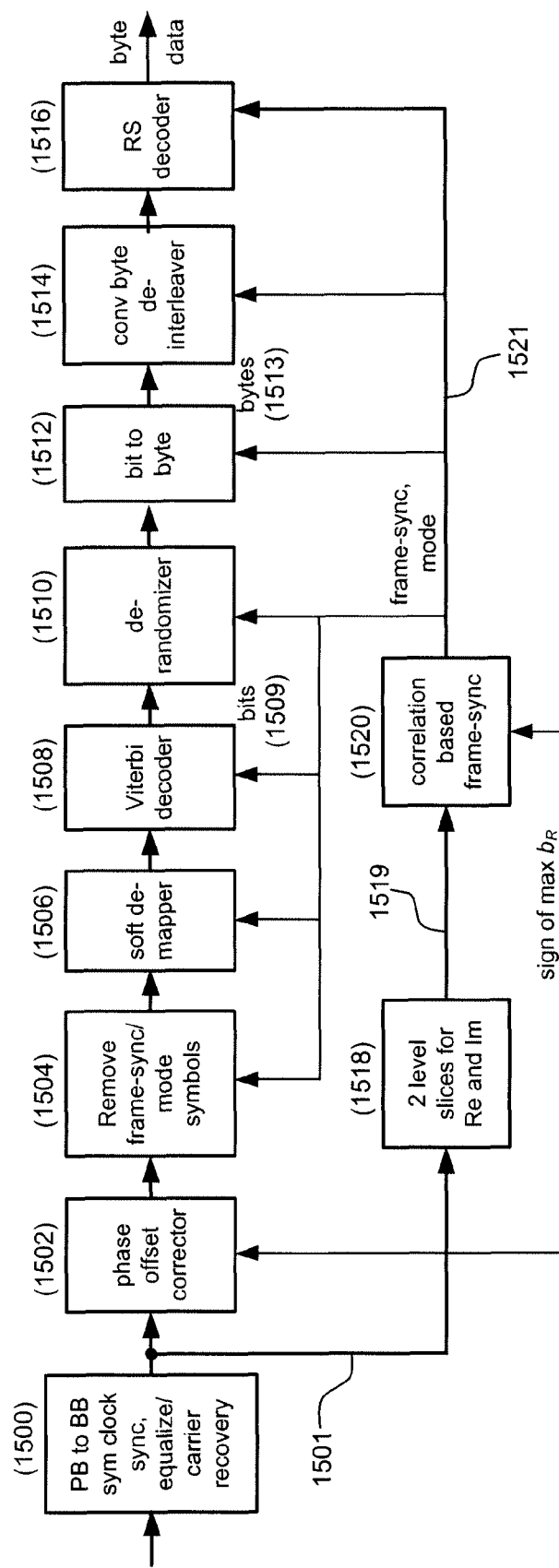
FIG. 15 is a block schematic of a demodulator according to certain aspects of the invention.

Turning now to FIG. 15, the QAM demodulators of FIGS. 5 and 6 is described in more detail and in the context of the latterly described frame structure. Module 1500 receives and converts transmitted data in a passband signal to baseband QAM symbols. The operations performed by module 1500 typically include symbol clock synchronization, equalization (to remove inter-symbol interference) and carrier recovery, typically using sub-modules. Accordingly, module 1500 may comprise an equalizer that outputs recovered baseband QAM symbols 1501. Baseband QAM signals 1501 are provided to two-level slicer 1518 for slicing in both the real and imaginary directions, thereby forming the sequences $a_R[k]\epsilon[-1,+1]$ and $a_I[k]\epsilon[-1,+1]$ 1519 which are provided to frame-sync module 1520.

Frame sync module 1520 performs a continuous cross-correlation operation on the incoming sliced QAM symbols 1519, separately for both the real and imaginary parts, with a stored copy of the binary frame-sync PN sequence. Each member of the stored copy has a value of −1 or +1. This operation is given by:

$$b_R[k] = \sum_{n=0}^{126} s[n]a_R[n-k] \text{ and } b_I[k] = \sum_{n=0}^{126} s[n]a_I[n-k] \quad \text{Eq. 1}$$

where s is the stored copy in the 127 long frame-sync PN sequence. The maximum magnitude of either $b_R$ or $b_I$ indicates the start of the FEC data frame. A frame sync pulse or other synchronizing signal is communicated to one or more of the receiver modules when this FEC data frame start point is detected in the stream.

Figure 16A:
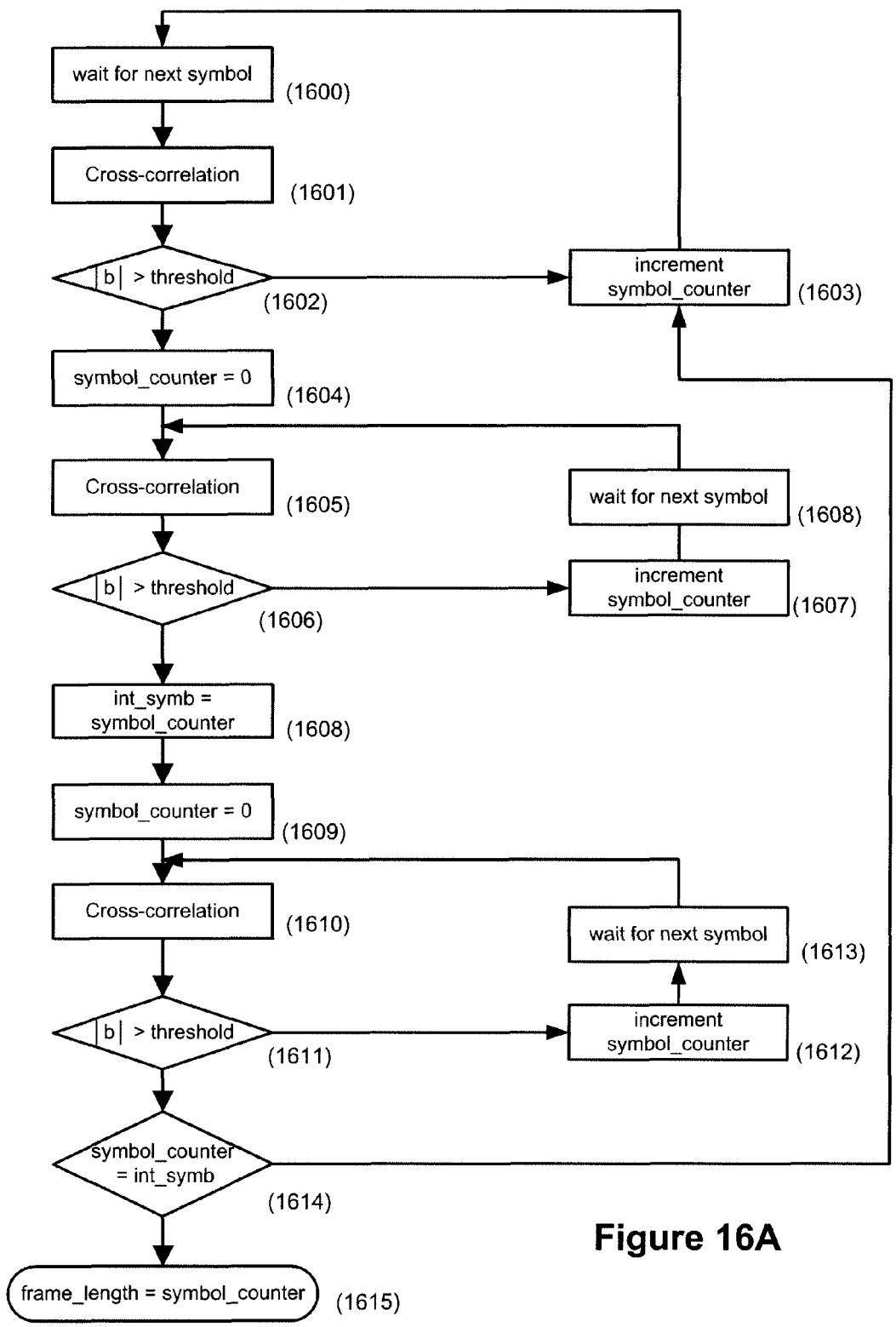

FIGS. 16A and 16B show elements of a process that can reliably produce a frame sync pulse when a noisy signal is received. FIG. 16A shows a portion of the process that determines frame length. Frame length can vary depending on selected transmission mode (Table 1). A process commencing at step 1600 is repeatedly executed as symbols are received, and a symbol counter keeps track of a number of symbols between executions that result in a value above a predetermined threshold. At step 1601, cross-correlation (see Eq. 1) is performed for each arriving symbol and the symbol counter is incremented until the predetermined threshold is determined at step 1602 to have been exceeded. The symbol counter is incremented 1603 for each symbol until the threshold is exceeded. When the threshold is exceeded at step 1602, then the symbol counter is cleared 1604 and steps of cross-correlating 1605, incrementing symbol counter 1607 and receiving a new symbol 1608 are repeated until it is determined that the threshold has been exceeded at step 1606. An intermediate symbol count is recorded at step 1608 and the symbol counter is reset at step 1609. The steps of cross-correlating 1610, incrementing symbol counter 1612 and receiving a new symbol 1613 are repeated until it is determined that the threshold has been exceeded at step 1611. If at step 1614 the symbol counter is the same as the intermediate symbol count recorded at step 1608, then the frame length is returned at 1615 as the value of the symbol counter. It will be appreciated that, in the example described, frame length can be determined after two consecutive consistent counts. However, the number of required consecutive identical counts may be selected as desired.

FIG. 16B illustrates one process by which frame sync module 1520 produces correctly timed frame sync pulses even when the received signal is very noisy. The process also provides for acquisition of a new frame sync position when a temporary interruption of the signal occurs or after transmitter transmission mode changes cause corresponding changes in frame size. A free running symbol counter counts the received symbols using modulo frame size arithmetic, where frame size has been determined by the steps described in connection with FIG. 16A. It is anticipated that, when the result of the Eq. 1 cross-correlation is above the selected threshold value, the symbol counter value will always have the same value. When the value is consistent, a confidence counter is incremented up to a selected maximum (e.g. maximum=16); otherwise the confidence counter is decremented (to a minimum of zero).

Thus, upon receipt of a symbol at 1650, cross correlation (Eq. 1) is performed at 1651 and, if the result at 1652 exceeds the threshold value, the current maximum is set to the threshold value and a maximum point is set to the current value of the symbol counter at 1653. In the example depicted, if the confidence counter is set to at least a value of 4 (1654) and the current symbol count indicates the frame synchronization point (1655), then a frame sync signal is output at 1656. Next, the symbol counter is incremented at 1657, here using modulo 4 addition. The next symbol is awaited at step 1677 unless, at step 1670, the symbol counter is determined to be zero. If the symbol counter is zero, then the current maximum value is reset at 1671. Then, if the current maximum point is equal to the frame synchronization point at 1672, the confidence counter is incremented at 1673 and the next symbol is awaited at step 1677; otherwise, the confidence counter is decremented at 1674. In the presently illustrated example, if the confidence is determined to have fallen below 2 at step 1675, then the frame synchronization point is set to the current maximum point at step 1676. In either case, the next symbol is awaited at step 1677.

In summary, according to the described process, frame synchronization is determined to have been reliably acquired when the confidence counter exceeds a predetermined value—for this example, a value of 4. The frame sync module can then be cleared to provide a frame sync pulse at the correct time. The frame sync pulse will be output at the correct time—typically corresponding to a start of frame—if the confidence counter exceeds 4, even if noise occasionally causes Eq. 1 to produce a low value.

Figure 17:
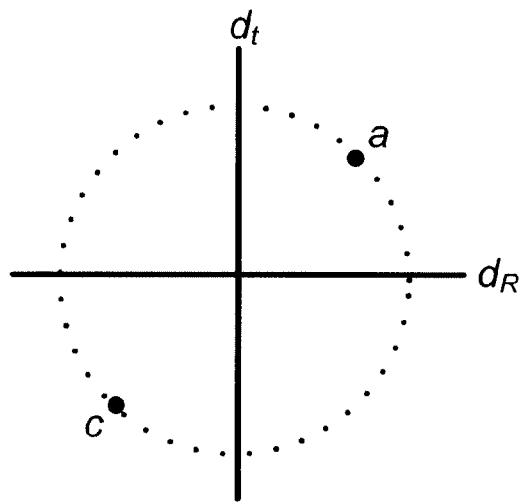
FIG. 17 illustrates a transmitted constellation.

If the transmission mode changes, the confidence counter will ultimately count back to zero. This can be used to trigger a recalculation of frame length (e.g. using the process of FIG. 16A) of determining the new frame length. As will be described below in relation to carrier recovery, there can be a π/2 ambiguity in the recovered carrier phase which may result in an arbitrary additional recovered phase offset of zero, ±π/2 or π. For frame sync symbols, the real and imaginary parts are the same sign and the transmitted constellation is shown in FIG. 17.

Thus, it will be appreciated that, for zero phase offset, the signs of the maximum magnitude $b_R$ and $b_I$ are both positive. As summarized in Table 3, a −π/2 offset will yield a negative maximum magnitude $b_R$ and a positive maximum magnitude $b_I$; for an offset of π, both $b_R$ and $b_I$ will be negative, and for an offset of π/2, the maximum magnitude $b_R$ will be positive and the maximum magnitude $b_I$ will be negative.

TABLE 3

| Sign of max $b_R$ | Sign of max $b_I$ | Phase Correction Needed |
|---|---|---|
| + | + | 0 |
| − | + | +π/2 |
| − | − | +π |
| + | − | −π/2 |

Thus, the respective signs of the maximum magnitude $b_R$ and $b_I$ in combination can indicate the quadrant of the complex plane to which the final phase offset has converged. This permits an additional phase correction to be applied to the signal in phase offset corrector module 1502. The signs of the maximum $b_R$ and $b_I$ may be sent from the correlation based frame-sync module 1520 to the phase offset corrector 1502.

Figure 18:
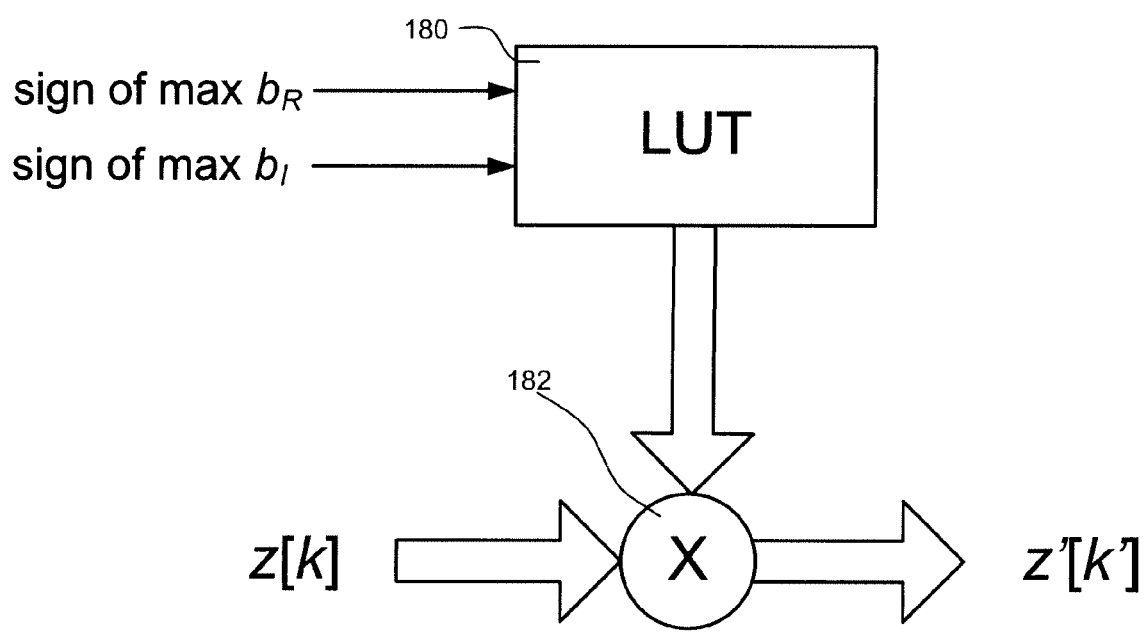
FIG. 18 is a simplified block schematic of a phase offset corrector employed in certain embodiments of the invention.

With reference also to FIG. 18, the operation of certain aspects of phase offset corrector 1502 in the example of FIG. 15 can be better understood. LUT 180 generates an output based on the signs of the maximum magnitude $b_R$ and $b_I$ (see Table 3). Given that $z[k]=z_R[k]+jz_I[k]$, operation 142 can be executed as follows:

$$\text{For the case of } \phi = +\pi: z'[k] = -z_R[k] - jz_I[k] \quad 1)$$

$$\text{For the case of } \phi = +\frac{\pi}{2}: z'[k] = -z_I[k] + jz_R[k] \quad 2)$$

$$\text{For the case of } \phi = -\frac{\pi}{2}: z'[k] = +z_I[k] - jz_R[k] \quad 3)$$

Figure 19:
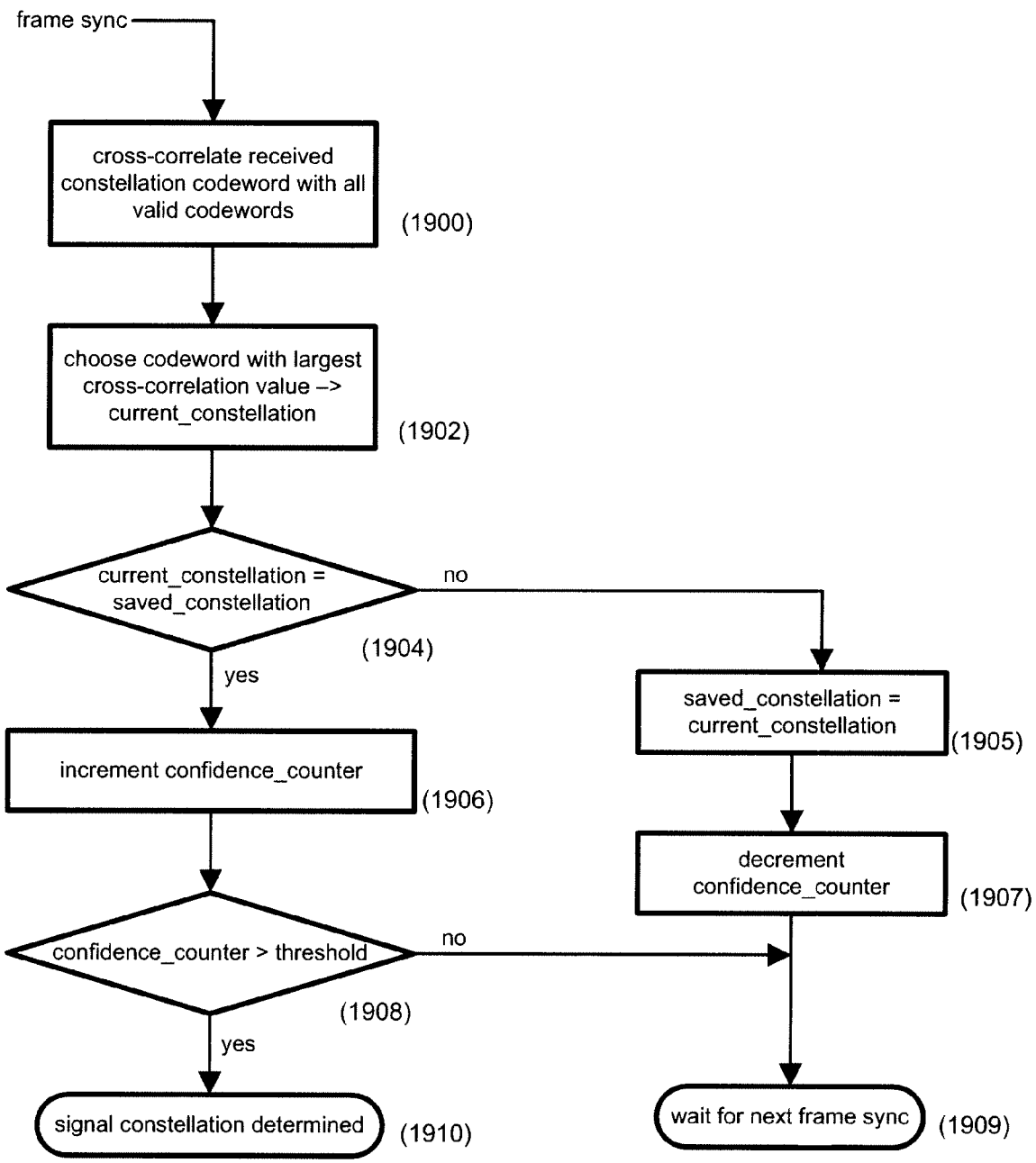
FIG. 19 illustrates a process for determining reliability related to frame synchronization.

Once the frame sync start position is located and the mπ/2 phase offset corrected, the position of the code words containing the mode bits (constellation and trellis code rate) is known. The code words can then be reliably decoded by, for example, a BCH decoder or by correlating the received code word with all the possible code words and choosing the code word yielding the highest resulting value. Since this information is sent repeatedly, additional reliability can be obtained by requiring that the same result occur multiple times before it is accepted. FIG. 19 shows an example of such a process that can be performed by frame-sync module 1520.

Continuing with the system of FIG. 15, frame-sync signal 1521 output from the frame-sync module 1520 can be used to indicate which symbols are to be removed in module 1504. before symbols are fed to the soft de-mapper. In one example, 127 frame-sync symbols and 8 mode symbols are removed from the stream ensuring that only symbols corresponding to the RS packets are passed to soft de-mapper 1506. Soft de-mapper 1506 calculates soft bit metrics using algorithms that are known in the art including, for example, algorithms described by Akay and Tosato. For correct operation, soft de-mapper 1506 must know which puncture pattern (which trellis code rate) was used in the transmitter and also the alignment of that pattern with the received bits. This information 1521 is provided by frame-sync module 1520 which decodes the mode information and also provides a repeating frame sync signal to which the puncture pattern is aligned, regardless of the current mode. These soft bit metrics are fed to Viterbi decoder 1508 that operates in a manner known in the art to arrive at estimates of the bits that were input to the PTCM encoder in the transmitter.

De-randomizer 1510, byte de-interleaver 1514, and RS decoder 1516, which are all synchronized by the frame-sync signal 1521, respectively de-randomize, de-interleave, and decode the byte data to obtain the data that originally entered the RS encoder in the transmitter.

Baseband to Passband Modulation

Figure 20:
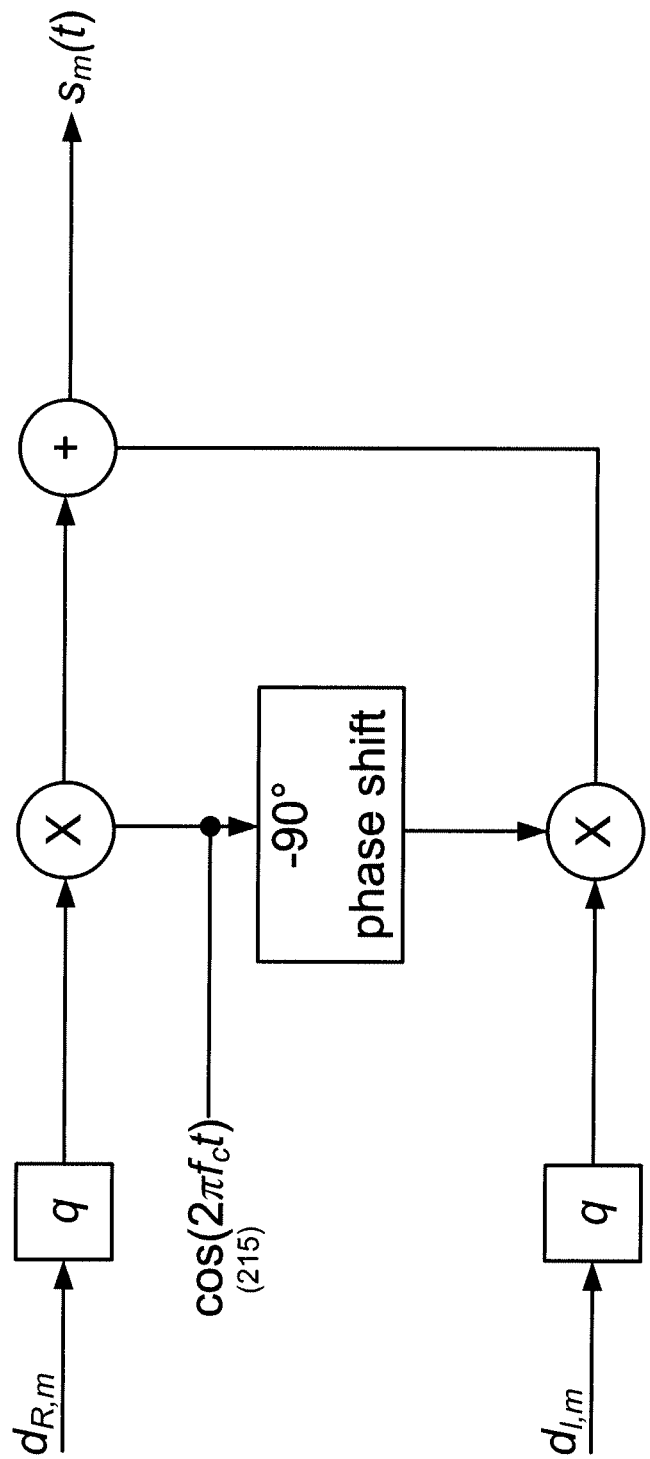
FIG. 20 depicts a simple QAM modulator employed in certain embodiments of the invention.

Certain wireless digital communication systems, including broadcast, wireless LAN, and wide area mobile systems, employ QAM in some form. QAM is also used in both the North American and European digital cable television standards using quadrature-carrier multiplexing that enables two double-side-band suppressed-carrier modulated waves to occupy the same channel bandwidth, with each wave modulated by an independent message. FIG. 20 depicts a simple QAM modulator that may serve as PB mod 814 in the example of FIG. 8. An isolated transmitted QAM pulse is given by:

$$s_m(t)=d_{R,m}q(t)\cos(2\pi f_c t)-d_{I,m}q(t)\sin(2\pi f_c t)=Re\{d_m q(t)e^{j2\pi f_c t}\},$$

where $d_{R,m}$ and $d_{I,m}$ are determined by two independent message streams and represent the real and imaginary parts respectively of a complex QAM symbol (see, e.g., FIG. 12), with m=1 . . . M indexing a 2-dimensional QAM constellation of cardinality where M is the modulating carrier frequency, and q(t) is a root raised cosine pulse function.

A continuous series of transmitted QAM pulses s(t), at a rate of $F_s=1/T_s$, passes through a noisy multipath channel. Thus, the received signal at the input to the QAM receiver is given by r(t)=s(t)*c(t)+v(t), where * denotes convolution, c(t) is the channel impulse response, and v(t) is additive white Gaussian noise.

Thus, $$r(t) = Re\left\{e^{j2\pi(f_{LO}+f_o)t+\theta_o}\sum_{n=-\infty}^{+\infty}[d[n]*q(t)]c(t-nT_s)\right\} + v(t),$$

where d[n] is the complex transmitted symbol, $f_o$ and $\theta_o$ are the frequency and phase offsets respectively of the receiver passband to baseband demodulator local oscillator with respect to the transmitter, such that $f_{LO}=f_c-f_o$.

Passband to Baseband Demodulator

Figure 21:
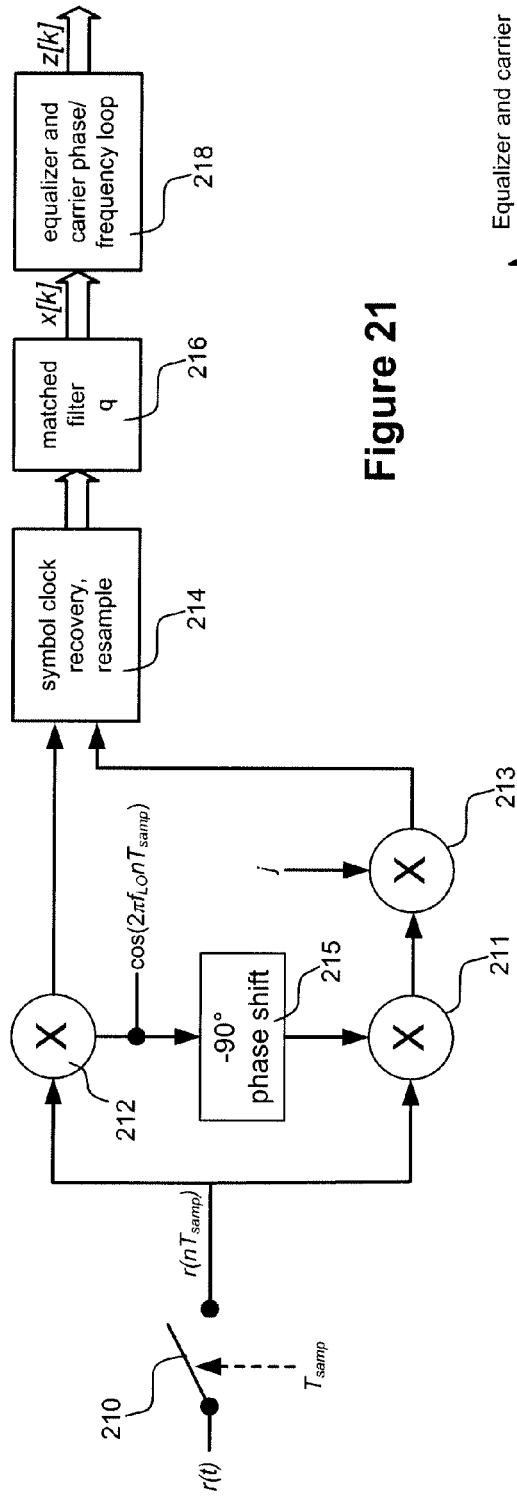
FIG. 21 shows a clock sync and equalizer/carrier recovery module employed in certain embodiments of the invention.

FIG. 21 shows the PB to BB, sym clock sync, equalizer/carrier recovery module 1500 of FIG. 15 in more detail. The received signal r(t)—observed at the output of a coax cable, for example—is sampled 210 at a rate higher than the symbol rate, resulting in the sampled signal r(nT$_{samp}$). After sampling:

$$r(nT_{samp}) = \text{Re}\left\{e^{j2\pi(f_{LO}+f_o)nT_{samp}+\theta_o} \sum_{m=-\infty}^{+\infty} [d[m]*q(nT_{samp})]c(nT_{samp}-mT_s)\right\} + v(nT_{samp}).$$

Then, after downconversion, resampling at the symbol rate $1/T_s$ and matched filtering obtains:

$$x(kT_s) = x[k] = e^{j2\pi f_o kT_s+\theta_o} \sum_{m=-\infty}^{+\infty} d[m]c[k-m] + v'[k],$$

where v'[k] is sampled complex filtered noise.

This assumes that, due to the pulse shaping and matched filtering q, combined with perfect symbol rate sample timing, any ISI is due only to the channel impulse response c.

Equalizer and Carrier Phase/Frequency Loop

Figure 22:
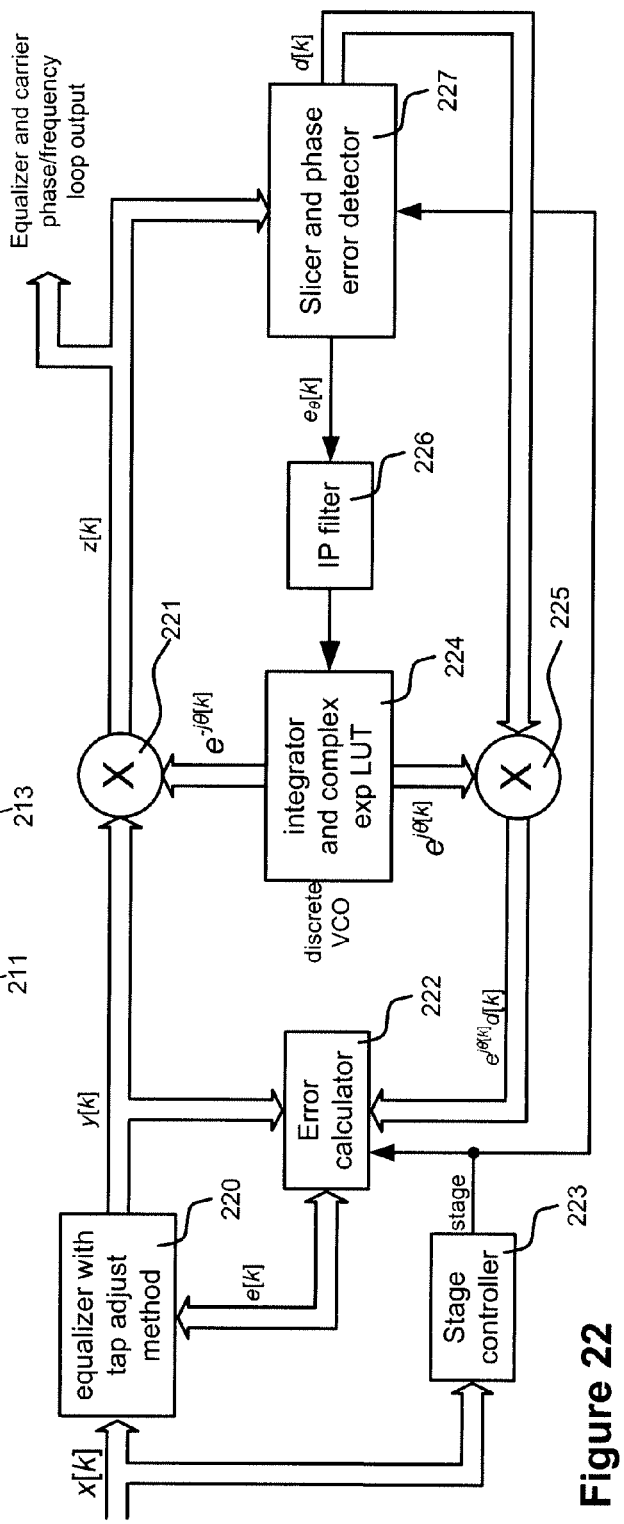
FIG. 22 illustrates certain aspects of an equalizer and carrier phase/frequency loop employed in certain embodiments of the invention.

Certain aspects of the equalizer and carrier phase/frequency loop 218 of FIG. 21 will now be described with reference to FIG. 22. A signal x[k] enters the digital equalizer and carrier phase/frequency loop 218, which can include an equalizer 220 that includes a linear digital filter. An error calculator module 222 calculates an error signal e[k], which can be used to calculate an updated set of filter tap weights using any suitable method known to those with skill in the art. In one example, an LMS algorithm may be used. The filter removes the ISI caused by the channel impulse response, c. An output of equalizer 220 y[k] is then phase rotated at 221 in order to reduce any remaining carrier phase and frequency offset. The phase rotated output z[k] is then processed by slicer and phase error detector module 227 which calculates a phase error value e$_\theta$[k] that feeds an integral-proportional (IP) filter 226. IP filter 226 output feeds an integrator and complex exponential look up table ("LUT") 224 which calculates complex exponential values used in the loop to correct the carrier phase and frequency offset. Slicer and phase error detector module 227 also outputs a nearest neighbor 2-dimensional sliced symbol decision whose phase is "un-corrected" by multiplication with $e^{+j\theta[k]}$ at 225 and then used in error calculator module 222. Error calculator module 222 utilizes that input as well as x[k] to calculate and error signal e[k]. As depicted, the internal operations of the error calculator module 222 and slicer and phase error detector module 227 depend on a current stage of operation (1, 2 or 3) that is determined by stage controller 223.

In certain embodiments, a least mean squares ("LMS") algorithm is used for calculating equalizer filter tap weights and operates as follows:

let x[k] represent an L long equalizer input vector, y[k] represents the equalizer output vector, where y[k]=g$^H$[k]x[k], where g$^H$[k] is the L long linear equalizer tap weight vector and the H superscript indicates conjugate transposition (Hermitian). Then, calculate updated e[k] in the error calculator module 222 using, for example, the methods described below:

$$g[k+1]=g[k]-2\mu x[k]e^*[k], \quad \text{Eq. 2}$$

where μ is a small step size parameter and the * superscript indicates complex conjugation.

In the example, the stage controller 183 takes the equalizer and carrier phase/frequency loop 218 through three stages of operation, whereby switching from stage 1 to stage 2 to stage 3 is executed based on simple count thresholds of input data samples x[k]. Note that more complicated stage switching based on estimates of error at the equalizer output are also possible. The three stages are summarized in Table 6.

TABLE 6

Equalizer and Carrier Phase/Frequency Loop Stages

| Stage | e$_\theta$[k] calc. method | e[k] calc. method | State of freq./phase recovery |
|---|---|---|---|
| 1 | CMA | Always zero | Constellation spinning |
| 2 | CMA | Based on reduced constellation (RCCR) | Phase/freq. gradually recovered |
| 3 | DD | Based on full constellation | Phase noise reduced |

Figure 23:
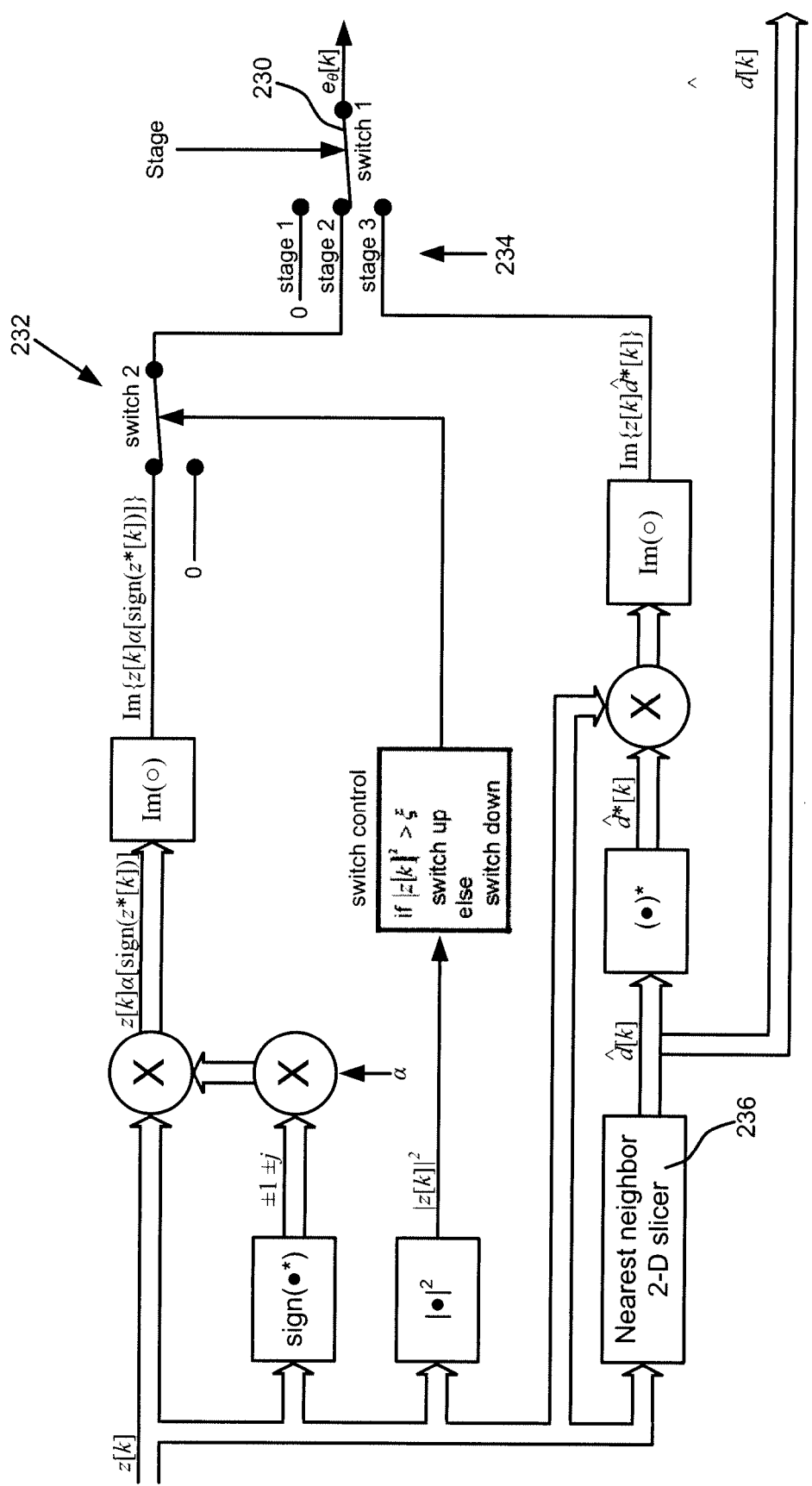
FIG. 23 shows a slicer and phase error detector module employed in certain embodiments of the invention.

A slicer and phase error detector module 227 is shown in more detail in FIG. 23. Switch 230 is set according to one of three stages 234 of operation. During stage 1, switch 230 is in the topmost position so that e$_\theta$[k]=0. This effectively turns off the carrier loop so that there is no carrier phase correction during this stage. During stage 2, switch 230 is in the middle position and the loop operates using a reduced constellation carrier recovery (RCCR) algorithm. If the power of the signal z[k] given by |z[k]|$^2$ exceeds a threshold ξ, then it is presumed that z[k] is one of the corner symbols of the constellation and RCCR is enabled by setting depicted second switch 232 to upper position, yielding e$_\theta$[k]=Im{z[k]α⌊sign(z*[k])⌋}. Otherwise, if |z[k]|$^2$≤ξ, second switch 232 is in the lower depicted position disabling the carrier loop. Thus only a subset of the symbols can contribute to carrier recovery during stage 2. The threshold ξ can be reduced to include more symbols in the regions near the constellation corners, but the resultant phase correction term e$_\theta$[k] will be noisier. During stage 3, switch 230 is in the lowest depicted position, yielding e$_\theta$[k]=Im{z[k]d̂*[k]}, where d̂*[k] is the complex conjugate of the nearest neighbor 2-dimensional sliced symbol decision d̂[k]. During stage 3, it is presumed that enough time has passed so that the equalizer taps have converged and the carrier phase has been substantially corrected such that the sliced symbol decisions are reliable.

Notably, the relations e$_\theta$[k]=Im{z[k]α⌊sign(z*[k])⌋} and e$_\theta$[k]=Im{z[k]d̂*[k]} effectively operate within a single quadrant of the complex plane. This results in an mπ/2 ambiguity in recovered carrier phase as discussed above.

Figure 24:
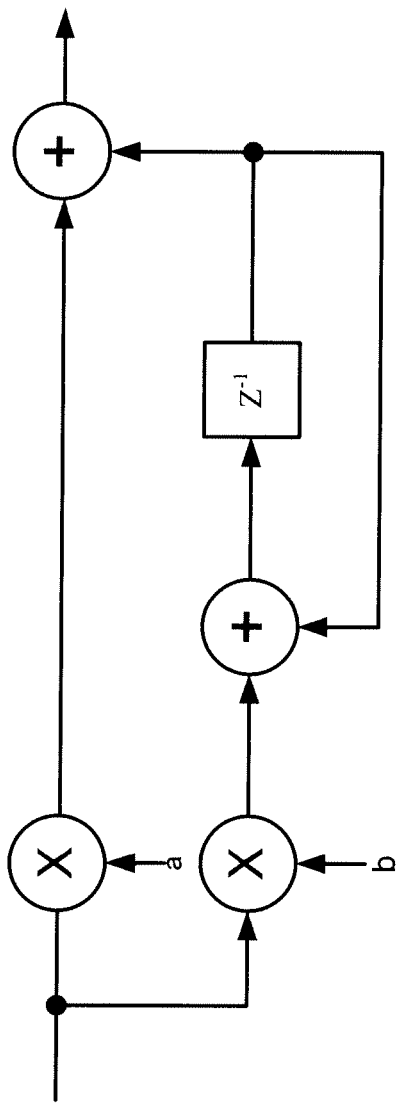
FIG. 24 shows an IP filter employed in certain embodiments of the invention.
Figure 25:
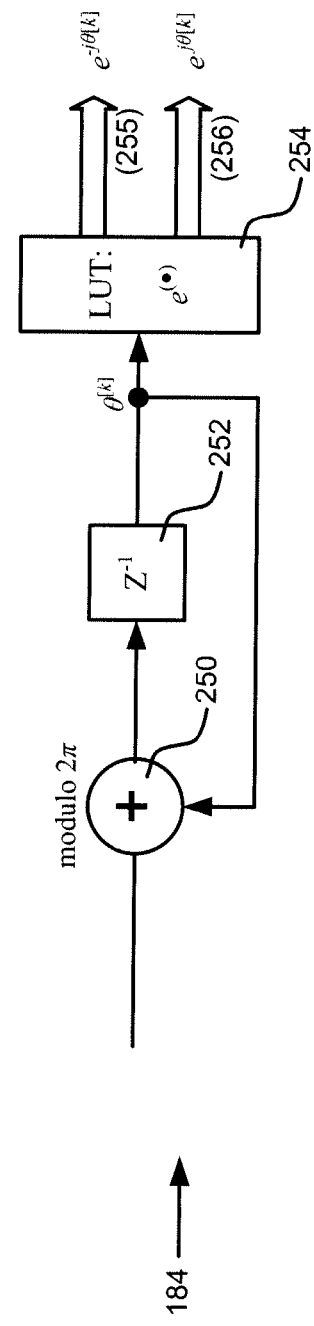
FIG. 25 illustrates a complex exponential LUT module employed in certain embodiments of the invention.

An example of an IP filter 226 (see FIG. 22) is shown in more detail in FIG. 24. IP filter 226 allows the loop to correct both phase and frequency offsets. The output of the IP filter 226 feeds the integrator and complex exponential LUT module 224, shown in more detail in FIG. 25. The input of integrator/LUT 224 is modulo 2π added 250 to a one step delayed 252 version of the input to form a phase error signal θ[k] which is fed to a lookup table (LUT) 254 that outputs phase correction factor 255 ($e^{-j\theta[k]}$) that corrects for both θ$_o$ and f$_o$. LUT 254 also provides an output 256 ($e^{+j\theta[k]}$) that "un-corrects" the slicer output d̂[k] so that it can be used to derive an error signal for the equalizer tap update. This is needed because the equalizer operates on x[k] which contains both θ$_o$ and f$_o$.

Error Calculator Module and Stage Operation Summary

Figure 12:
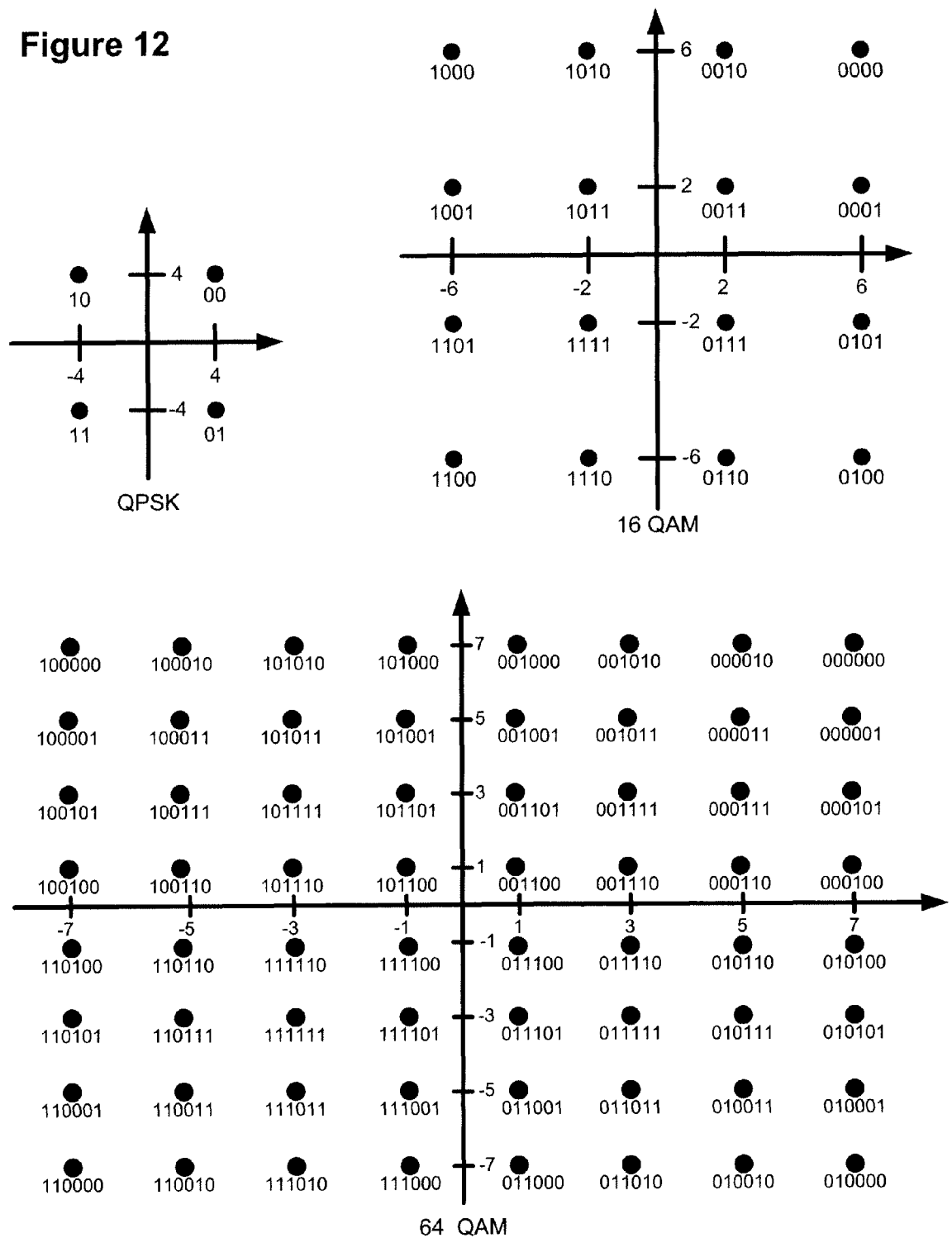
FIG. 12 illustrates examples of QAM mappings.

Error calculator 222 can employ different methods for calculating e[k] depending on the stage. For stages 1 and 2, e[k] is typically calculated using a process based on a constant modulus algorithm (CMA):

$$e[k]=y[k](|y[k]|^2-R),$$

where R is a pre-determined constant given by:

$$R = \frac{E\{|d[k]|^4\}}{E\{|d[k]|^2\}},\qquad\text{Eq. 3}$$

and where E is the expectation operator and d[k] is a symbol from FIG. 12.

Note that this e[k], which drives the tap update of Eq. 2 above, is independent of symbol decisions and the phase of x[k] and depends only on the equalizer output, the equalizer input, and the statistics of the constellation. It can be shown that during stages 1 and 2, the use of the CMA error to drive Eq. 2 is equivalent to minimizing the ISI, even though the constellation is spinning due to the carrier frequency and phase offsets.

Thus, during stage 1, the phase/frequency recovery loop is disabled, and the equalizer minimizes the ISI using the CMA error function. After the 151 has been minimized, stage 2 begins and the loop is turned on for RCCR; carrier phase/frequency recovery begins using only the corner symbols of the constellation, as previously explained in relation to FIG. 23. At the end of stage 2, carrier phase and frequency have been recovered sufficiently so that the 2-dimensional slicer 236 of FIG. 23 begins to output reliable symbol decisions d̂[k].

Decision directed (DD) error may be used in stage 3. The DD error may be calculated as $e[k]=e^{j\theta[k]}\hat{d}[k]-y[k]$. It will be appreciated that it is assumed here that the receiver has determined which of the three constellations of FIG. 12 is being transmitted, because R is different for each of these constellations. Additionally, RCCR requires knowledge of the constellation and, in particular, knowledge of the power of the corner symbols of the constellation.

Stage Switching

Certain embodiments employ stage switching that is based on estimates of mean square error at the output of the equalizer. An accurate estimate of the mean square error ("MSE") of the equalizer output can be obtained from a series of errors e[k] calculated by the error calculator module 222 of FIG. 22. For example, an estimate may be obtained by using:

$$\text{MSE}[k]=(1-\beta)e^2[k]+\beta\text{MSE}[k-1],\qquad\text{Eq. 4}$$

where β<1 is a forgetting factor. Other methods for averaging e[k] are known and can be used. Eq. 4 produces a result that can be compared to a predetermined threshold and used by the stage controller module 223 of FIG. 22 to switch operation from stage 1 to stage 2 when MSE[k] drops below that threshold. It can be compared to a second predetermined threshold to switch operation from stage 2 to stage 3 when MSE[k] drops below that second threshold.

Detecting Disconnect and Re-Connect

Certain embodiments provide systems and methods for detecting disconnect and re-connect events on the camera side of a communications link. Referring again to FIGS. 7A and 7B, partial or complete disconnection of signals between modems 32 and 34 may occur in normal operation. Certain disconnections affect QAM signaling between camera-side modem 32 and monitor-side SLOC modem 34. In particular, signals that carry images captured by HD camera 30 are encoded and/or modulated by modem 32 for transmission over cable 33 to display side modem 34. A plurality of methods of detecting disconnection and re-connection events related to the coax 33 (see FIGS. 7A and 7B) can be performed by the camera-side SLOC modem 34. Responsive to a disconnection or re-connection event, the modem 34 can halt or commence or recommence downstream passband QAM transmission. In some embodiments a "coax connected" signal transmitted from a QAM demodulator to a QAM demodulator may be used for connection-related event.

Figure 26:
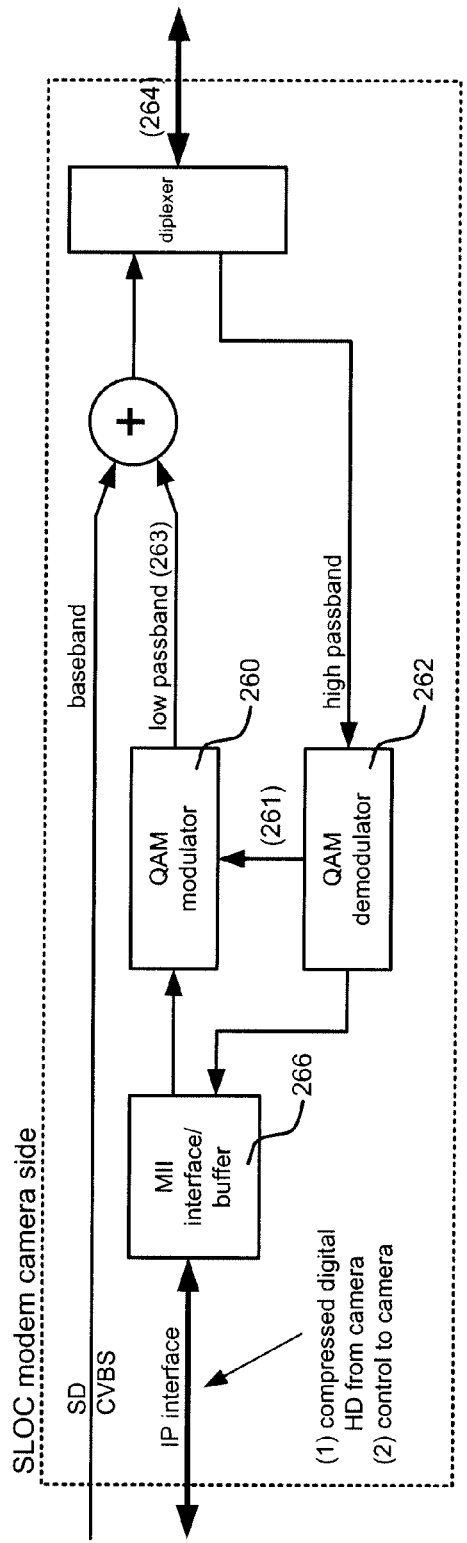
FIG. 26 shows a camera side QAM modulator employed in certain embodiments of the invention.

Referring to FIG. 26, for example, a camera side QAM modulator 260 may be configured to transmit a downstream passband signal 263 only when a coax connected signal 261 is asserted by a camera side QAM demodulator 262. Camera side QAM demodulator 262 can determine the presence of input signal 264 that is transmitted by the monitor side QAM modulator using a variety of methods. Typically, the coax connected signal 261 is asserted by the camera side QAM demodulator 262 when reception of input signal 264 is reliably confirmed, when constellation identification is confirmed and/or upon verification of a frame sync has been obtained.

Figure 27:
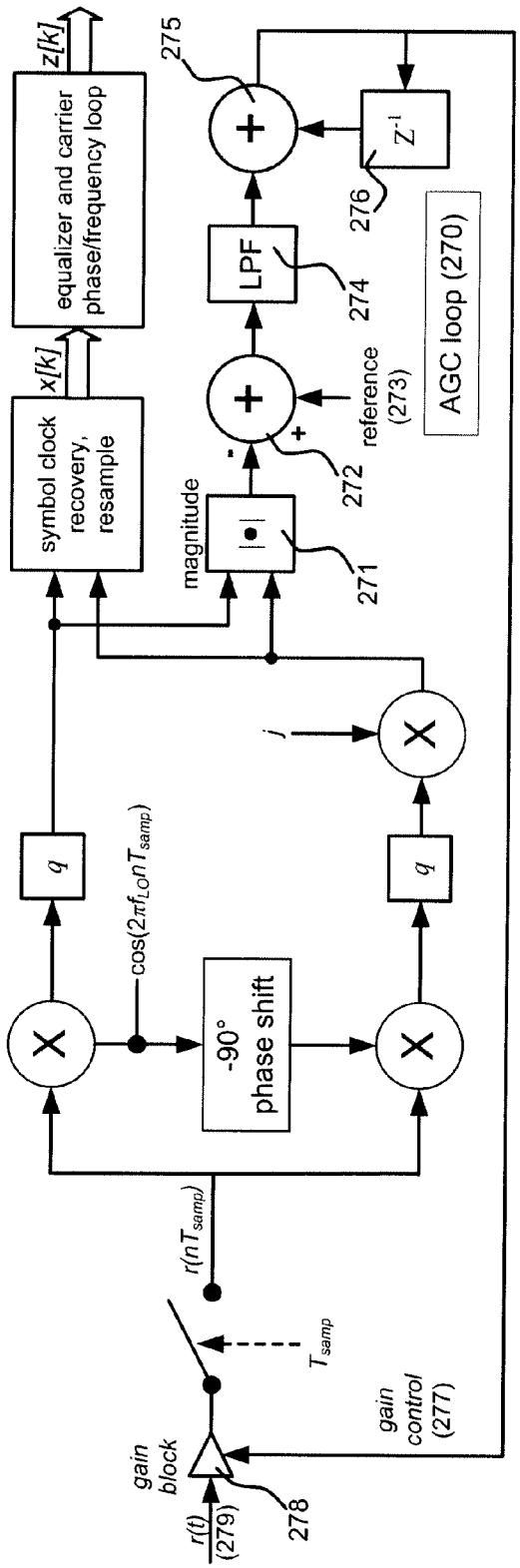
FIG. 27 illustrates certain aspects of an automatic gain control loop.

One method of detecting presence of input signal 264 includes a method based on an automatic gain control ("AGC") loop 270. Commonly found in communications receivers, including QAM demodulators, AGC is used to control signal levels at various stages and points in the receiver. One example is depicted in FIG. 27 which shows an AGC added to the receiver front end of FIG. 21. In the AGC loop 270, the magnitude of a complex signal is determined at 271 and subtracted at 272 from a predetermined reference level 273. The result is filtered by low pass filter (LPF) 274 to suppress noise and short term variations. The LPF 274 provides an output that feeds an accumulator comprising an adder 275 and a delay element 276. The accumulator output is used as gain control signal 277 that is fed back to gain block 278 at the system input 279. In one example, gain control signal 277 is used as a gain factor or multiplier that determines the gain provided by gain block 278 such that the gain provided by gain block 278 increases within predetermined limits as gain control 277 increases. When input 279 is disconnected (e.g. the coax is disconnected), output of magnitude block 271 tends to be very low. The coax connected signal 261 may typically be asserted only if the magnitude block output is above a predetermined threshold. Additionally, gain control signal 277 is typically very high when input 279 is disconnected. Thus, the coax connected signal 261 may be asserted only if the gain control signal is below a predetermined threshold. An AGC loop can be used to monitor connection status of input 279 even if the loop is found elsewhere in the QAM demodulator 262.

Another method of detecting presence of input signal 264 includes a method based on equalizer and carrier phase/frequency loop stages shown in FIG. 23 (see also Eq. 4). In particular, the coax connected signal 261 may be asserted when the QAM modulator stage controller 234 of the QAM demodulator 262 (initially at stage 1) switches to stage 2 based on the results of Eq. 4. The stage 1 to stage 2 transition occurs only if the coax is connected and the QAM demodulator 262 is actively receiving an upstream signal from the monitor side QAM modulator. Any subsequent disconnection of the coax will cause loss of signal, an increase in the MSE calculated by Eq. 4 and will lead to a reversion to stage 1. Thus, the coax connected signal 261 can be reset or otherwise de-asserted when the QAM demodulator 262 is at stage 1. In some embodiments, it the camera side QAM demodulator 262 may be required to have achieved stage 3 before asserting the coax connected signal 261.

Another method of detecting presence of input signal 264 includes methods based on the demodulator frame sync confidence counter discussed in relation to FIG. 16B. In particular, the coax connected signal 261 can be asserted by the camera side QAM demodulator 262 only when the confidence counter registers a value that is greater than a predetermined threshold value. In one example, the threshold value may be 4. Accordingly, the coax connected signal 261 will be asserted only when the coax is connected and the monitor side modem is transmitting SLOC frames to the camera. If the frame sync process continues to free run even if no symbols are being received, disconnection will cause the confidence counter to count backwards and eventually to fall below 4 and the coax connected signal 261 will be de-asserted.

Another method of detecting presence of input signal 264 includes methods that are based on higher layer protocols. Referring back to FIG. 3, HD camera 30 and the monitor side host 38 may be communicating using a networking protocol. For the purposes of this discussion, the ubiquitous Internet protocol (IP) will be used as an example of a networking protocol. Some modes of IP are inherently 2-way and result in data being sent both upstream and downstream. If the cable is disconnected, a network controller or processor in HD camera 30 and/or modem 32 recognizes that no return IP packets are arriving from the monitor side and can notify camera side SLOC modem 32 to cease passband transmission. In one example, such notification may include transmitting a special predetermined data packet from HD camera 30 to modem 32 through, for example MII interface 266 shown in FIG. 26.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. It will be further appreciated that the invention described here can be applied to digital communications systems employing other passband modulation and forward error correction methods. Those skilled in the art will also recognize that more than two points in the FFT of passband digital equalizer tap weight vector g[n] may be used to select an analog filter for the CVBS signal.

Those skilled in the art will also recognize that the invention could be practiced with other types of digital equalizer designs for the passband signal, including frequency domain equalizers, where the values of $G_1[k]$ and $G_2[k]$ will have already been calculated as part of the equalization process. Also, well known equalizer tap weight calculation methods other than LMS may be employed, such as RLS. Those skilled in the art will further recognize that the CVBS analog filter with selectable responses may take a form other than the one shown here.

Also, the equalizer for the CVBS signal may take the form of a digital filter, in which case the CVBS is sampled and digitized prior to equalization. In this case the tap weights of the digital filter are selected from a pre-determined set of Mtap weight vectors according to the same algorithm that was described to select one of Manalog filter responses.

Certain additional aspects and features of the invention are further set forth below, and can be obtained using the functionalities and components described in more detail above, as will be appreciated by those skilled in the art after being taught by the present disclosure.

Certain embodiments of the invention provide systems and methods for transmitting video signals. Some of these embodiments comprise a camera-side modem configured to receive two signals from a video camera. In some of these embodiments, each signal is representative of sequence of images captured by the camera. In some of these embodiments, the camera-side modem is configured to transmit one of the two signals as a composite baseband video signal and to modulate and transmit the other signal as a passband video signal that does not overlap the baseband signal. In some of these embodiments, the camera-side modem includes a mixer that combines the baseband and passband video signals to provide a transmission signal. In some of these embodiments, the camera-side modem includes a diplexer configured to transmit the transmission signal over a transmission line and to extract a received passband signal from the transmission line. In some of these embodiments, the camera-side modem includes a detector that monitors the camera-side modem and generates an enable signal when the received passband signal is identified. In some of these embodiments, the enable signal controls transmission of at least one of the baseband video signal and the passband video signal.

In some of these embodiments, the passband video signal is transmitted only when the enable signal is generated. In some of these embodiments, the received passband signal is quadrature amplitude modulated. In some of these embodiments, the detector monitors an estimate of mean square error in a quadrature amplitude demodulator. In some of these embodiments, the enable signal is generated when the estimate exceeds a threshold value. In some of these embodiments, the detector monitors a constellation detector. In some of these embodiments, the enable signal is generated based on a measurement of reliability provided by the constellation detector. In some of these embodiments, the measurement of reliability is based on a sequence of frame synchronizations. In some of these embodiments, the detector monitors an estimate of mean square error in an equalizer. In some of these embodiments, the enable signal is generated when the estimate exceeds a threshold value.

In some of these embodiments, the detector monitors a gain factor in an automatic gain control module of the camera-side modem, and wherein the enable signal is generated when the gain factor has a value less than a threshold value. In some of these embodiments, the detector monitors a magnitude of the received passband signal. In some of these embodiments, the enable signal is generated when the magnitude has a value that exceeds a threshold value. In some of these embodiments, the received passband signal comprises data encoded according to Internet protocols.

Certain embodiments of the invention provide systems and methods for controlling signaling in a security system. Some of these embodiments comprise determining presence of an upstream QAM signal in a composite signal transmitted on a coax cable at an upstream modem. Some of these embodiments comprise causing the upstream modem to transmit a composite baseband video signal and a passband video signal on the coax cable when the upstream QAM signal is determined to be present. In some of these embodiments, the composite baseband video signal and the passband video signal are concurrent representations of a sequence of images captured by a video camera. Some of these embodiments comprise causing the upstream modem to transmit the composite baseband video signal on the coax cable and to prevent transmission of the passband video signal, when the upstream QAM signal is determined to be absent.

In some of these embodiments, the upstream QAM signal is determined to be present when a gain value in an automatic gain control signal exceeds a threshold value. In some of these embodiments, the upstream QAM signal is determined to be present when a measurement of magnitude of the upstream QAM signal is less than a threshold value. In some of these embodiments, the upstream QAM signal is determined to be absent when an estimate of mean square error in an equalizer exceeds a threshold value. In some of these embodiments, the upstream QAM signal is determined to be present when an Internet protocol data packet is detected and/or identified in the upstream QAM signal.

Certain embodiments of the invention provide an automatically reconfigurable system for transmitting video signals. Some of these embodiments comprise an upstream modem configured to receive two signals from a video camera. In some of these embodiments, each signal is representative of sequence of images captured by the camera. In some of these embodiments, the upstream modem is configured to transmit one of the two signals as a composite baseband video signal and to modulate and transmit the other signal as a passband video signal that does not overlap the baseband signal. Some of these embodiments comprise a downstream modem configured to receive the composite baseband video signal and the passband video signal from the upstream modem and further configured to transmit an upstream passband signal to the upstream modem. In some of these embodiments, the upstream modem ceases transmission of at least one of the two signals when it detects a degradation in the upstream passband signal.

Certain embodiments of the invention provide systems and methods for transmitting video signals. Some of these embodiments comprise a camera-side modem configured to receive two signals from a video camera. In some of these embodiments, each signal is representative of sequence of images captured by the camera. In some of these embodiments, the camera-side modem is configured to transmit one of the two signals as a composite baseband video signal and to modulate and transmit the other signal as a passband video signal that does not overlap the baseband signal. In some of these embodiments, the camera-side modem includes a mixer that combines the baseband and passband video signals to provide a transmission signal, a diplexer configured to transmit the transmission signal over a transmission line and to extract a received passband signal from the transmission line and a detector that monitors the camera-side modem and generates an enable signal when the received passband signal is identified. In some of these embodiments, the enable signal controls transmission of at least one of the baseband video signal and the passband video signal.

In some of these embodiments, the passband video signal is transmitted only when the enable signal is generated. In some of these embodiments, the received passband signal is quadrature amplitude modulated. In some of these embodiments, the detector monitors an estimate of mean square error in a quadrature amplitude demodulator. In some of these embodiments, the enable signal is generated when the estimate is less than a threshold value. In some of these embodiments, the detector monitors a constellation detector and wherein the enable signal is generated based on a measurement of reliability provided by the constellation detector. In some of these embodiments, the measurement of reliability is based on sequential detections of a constellation that is one of a plurality of possible constellations. In some of these embodiments, the detector monitors frame synchronization and generates an enable signal when a sequence of frame sync pulses is detected in received passband signal. In some of these embodiments, the frame sync pulses are generated when FEC data frame start points are detected in the received passband signal.

In some of these embodiments, the detector monitors an estimate of mean square error in an equalizer, and wherein the enable signal is generated when the estimate exceeds a threshold value. In some of these embodiments, the received passband signal is quadrature amplitude modulated and the estimate of the mean square error is calculated from a series of error measurements in an error calculator module of the equalizer. In some of these embodiments, the received passband signal comprises data encoded according to an Internet protocol.

Certain embodiments of the invention provide methods for controlling signaling in a security system. Some of these embodiments comprise determining, at an upstream modem, presence of an upstream QAM signal in a composite signal transmitted on a coax cable. Some of these embodiments comprise causing the upstream modem to transmit a composite baseband video signal and a passband video signal on the coax cable when the upstream QAM signal is determined to be present. In some of these embodiments, the composite baseband video signal and the passband video signal are concurrent representations of a sequence of images captured by a video camera. Some of these embodiments comprise causing the upstream modem to transmit the composite baseband video signal on the coax cable and to prevent transmission of the passband video signal when the upstream QAM signal is determined to be absent. In some of these embodiments, the upstream QAM signal is determined to be present when an estimate of mean square error in an equalizer is less than a threshold value. In some of these embodiments, the estimate of mean square error is calculated from a series of error measurements received from an error calculator module in the equalizer. In some of these embodiments, the upstream QAM signal is determined to be present when a QAM constellation is detected in the upstream QAM signal. In some of these embodiments, the determination being based on a measurement of reliability provided by a constellation detector. In some of these embodiments, the measurement of reliability is based on a sequence of detections of the QAM constellation. In some of these embodiments, the upstream QAM signal is determined to be present when a sequence of frame sync pulses is detected in received passband signal. In some of these embodiments, the frame sync pulses are generated when FEC data frame start points are detected in the received passband signal.

Certain embodiments of the invention provide an automatically reconfigurable system for transmitting video signals. Some of these embodiments comprise an upstream modem configured to receive two signals from a video camera. In some of these embodiments, each signal is representative of a sequence of images captured by the camera. In some of these embodiments, the upstream modem is configured to transmit one of the two signals as a composite baseband video signal. In some of these embodiments, the upstream modem is configured to modulate and transmit the other signal as a passband video signal that does not overlap the baseband signal. Some of these embodiments comprise a downstream modem configured to receive the composite baseband video signal and the passband video signal from the upstream modem. In some of these embodiments, the downstream modem is configured to transmit an upstream passband signal to the upstream modem. In some of these embodiments, the upstream modem ceases transmission of at least one of the two signals when it detects a degradation in the upstream passband signal. In some of these embodiments, the upstream modem detects degradation in the upstream passband signal when an estimate of mean square error in a quadrature amplitude demodulator exceeds a threshold value. In some of these embodiments, the mean square error is calculated in one or more of an equalizer and a constellation detector.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A system for transmitting video signals, comprising a camera-side modem configured to receive two signals from a video camera, each signal being representative of sequence of images captured by the camera, and further configured to transmit one of the two signals as a composite baseband video signal and to modulate and transmit the other signal as a passband video signal that does not overlap the baseband signal, wherein the camera-side modem includes:
   a mixer that combines the baseband and passband video signals to provide a transmission signal;
   a diplexer configured to transmit the transmission signal over a transmission line and to extract a received passband signal from the transmission line; and
   a detector that monitors the camera-side modem and generates an enable signal when the received passband signal is identified,
   wherein the enable signal controls transmission of at least one of the baseband video signal and the passband video signal, and
   wherein the passband video signal is transmitted only when the enable signal is generated.

2. The system of claim 1, wherein the received passband signal is quadrature amplitude modulated.

3. The system of claim 2, wherein the detector monitors an estimate of mean square error in a quadrature amplitude demodulator, and wherein the enable signal is generated when the estimate is less than a threshold value.

4. The system of claim 2, wherein the detector monitors a constellation detector and wherein the enable signal is generated based on a measurement of reliability provided by the constellation detector.

5. The system of claim 4, wherein the measurement of reliability is based on sequential detections of a constellation that is one of a plurality of possible constellations.

6. The system of claim 1, wherein the detector monitors frame synchronization and generates an enable signal when a sequence of frame sync pulses is detected in received passband signal.

7. The system of claim 6, wherein the frame sync pulses are generated when forward error correction data frame start points are detected in the received passband signal.

8. The system of claim 1, wherein the received passband signal comprises data encoded according to an Internet protocol.

9. A system for transmitting video signals, comprising a camera-side modem configured to receive two signals from a video camera, each signal being representative of sequence of images captured by the camera, and further configured to transmit one of the two signals as a composite baseband video signal and to modulate and transmit the other signal as a passband video signal that does not overlap the baseband signal, wherein the camera-side modem includes:
   a mixer that combines the baseband and passband video signals to provide a transmission signal;
   a diplexer configured to transmit the transmission signal over a transmission line and to extract a received passband signal from the transmission line; and
   a detector that monitors the camera-side modem and generates an enable signal when the received passband signal is identified, wherein the detector monitors an estimate of mean square error in an equalizer, and wherein the enable signal is generated when the estimate exceeds a threshold value, and
   wherein the enable signal controls transmission of at least one of the baseband video signal and the passband video signal.

10. The system of claim 9, wherein the received passband signal is quadrature amplitude modulated and the estimate of the mean square error is calculated from a series of error measurements in an error calculator module of the equalizer.

11. The system of claim 9, wherein the received passband signal comprises data encoded according to an Internet protocol.

12. A method for controlling signaling in a security system, comprising: at an upstream modem, determining presence of an upstream quadrature amplitude modulation signal on a coax cable, wherein the upstream modem is configured to receive the upstream quadrature amplitude modulation signal from the coax cable; when the upstream quadrature amplitude modulation signal is determined to be present, causing the upstream modem to transmit a composite baseband video signal and a passband video signal downstream on the coax cable, wherein the composite baseband video signal and the passband video signal are concurrent representations of a sequence of images captured by a video camera; and when the upstream quadrature amplitude modulation signal is determined to be absent, causing the upstream modem to transmit the composite baseband video signal on the coax cable and to prevent transmission of the passband video signal, wherein the upstream quadrature amplitude modulation signal is determined to be present when an estimate of mean square error in an equalizer is less than a threshold value.

13. The method of claim 12, wherein the estimate of mean square error is calculated from a series of error measurements received from an error calculator module in the equalizer.

14. The method of claim 12, wherein the upstream quadrature amplitude modulation signal is determined to be present when a quadrature amplitude modulation constellation is detected in the upstream quadrature amplitude modulation signal, the determination being based on a measurement of reliability provided by a constellation detector.

15. The method of claim 14, wherein the measurement of reliability is based on a sequence of detections of the quadrature amplitude modulation constellation.

16. The method of claim 12, wherein the upstream quadrature amplitude modulation signal is determined to be present when a sequence of frame sync pulses is detected in a received passband signal that comprises the upstream quadrature amplitude modulation signal.

17. The method of claim 16, wherein the frame sync pulses are generated when forward error correction data frame start points are detected in the received passband signal.

18. An automatically reconfigurable system for transmitting video signals, comprising:
   a modem configured to:
      receive a first signal and a second signal from a video camera, each of the first signal and the second signal being representative of a sequence of images captured by the camera;
      transmit the first signal as a composite baseband video signal on a cable;
      modulate and transmit the second signal as a passband video signal on the cable, wherein the passband video signal does not overlap the baseband video signal;
      receive a third signal from the cable, wherein the third signal is transmitted on the cable by a different modem; and
      cease transmission of at least one of the first signal and the second signal if degradation in the third signal is detected.

19. The system of claim 18, wherein the different modem is configured to detect degradation in the third signal when an estimate of mean square error in a quadrature amplitude demodulator exceeds a threshold value, and wherein the mean square error is calculated in one or more of an equalizer and a constellation detector.

\* \* \* \* \*